United States Patent
Lewis

(10) Patent No.: US 12,040,961 B2
(45) Date of Patent: *Jul. 16, 2024

(54) METHOD AND SYSTEM FOR IMPLEMENTING HIGH AVAILABILITY (HA) WEB APPLICATION FIREWALL (WAF) FUNCTIONALITY

(71) Applicant: CenturyLink Intellectual Property LLC, Broomfield, CO (US)

(72) Inventor: Ronald A. Lewis, Monroe, LA (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,536

(22) Filed: Jul. 28, 2023

(65) Prior Publication Data
US 2023/0370353 A1  Nov. 16, 2023

Related U.S. Application Data

(63) Continuation of application No. 17/901,921, filed on Sep. 2, 2022, now Pat. No. 11,722,394, which is a
(Continued)

(51) Int. Cl.
*H04L 43/0852* (2022.01)
*H04L 9/40* (2022.01)
*H04L 67/01* (2022.01)

(52) U.S. Cl.
CPC .......... *H04L 43/0852* (2013.01); *H04L 63/02* (2013.01); *H04L 63/0263* (2013.01);
(Continued)

(58) Field of Classification Search
CPC . H04L 43/0852; H04L 63/02; H04L 63/0263; H04L 63/10; H04L 63/1408; H04L 67/01; H04L 63/0218
See application file for complete search history.

(56) References Cited

U.S. PATENT DOCUMENTS 9,432,335 B1 *  8/2016  Stevenson ........... H04L 63/0272
10,389,697 B1 *  8/2019  Kulkarni ............... H04W 12/08
(Continued)

*Primary Examiner* — Abiy Getachew

(57) ABSTRACT

Novel tools and techniques are provided for implementing firewall functionalities, and, more particularly, to methods, systems, and apparatuses for implementing high availability ("HA") web application firewall ("WAF") functionalities. In various embodiments, a first computing system might monitor network communications between a client and a server providing access to software applications, and might determine whether latency has been introduced as a result of at least one first WAF container having been launched and whether any introduced latency exceeds a predetermined threshold, each first WAF container being tuned to a corresponding software application and protecting the software application from network attacks. Based on a determination that latency has been introduced and based on a determination that the introduced latency exceeds the predetermined threshold, one or more second WAF containers may be launched, each being tuned to the corresponding software application. Subsequently, any unused or underutilized WAF containers may be decommissioned or deleted.

20 Claims, 11 Drawing Sheets

Related U.S. Application Data continuation of application No. 16/942,472, filed on Jul. 29, 2020, now Pat. No. 11,438,253, which is a continuation of application No. 16/119,382, filed on Aug. 31, 2018, now Pat. No. 10,735,291.

(60) Provisional application No. 62/711,352, filed on Jul. 27, 2018.

(52) U.S. Cl.
CPC .......... H04L 63/10 (2013.01); H04L 63/1408 (2013.01); *H04L 67/01* (2022.05)

(56) References Cited

U.S. PATENT DOCUMENTS

| | | | |
|---|---|---|---|
| 2013/0019314 A1* | 1/2013 | Ji | H04L 63/168 |
| | | | 726/25 |
| 2015/0052607 A1 | 2/2015 | Al Hamami | |
| 2016/0134405 A1* | 5/2016 | Luo | H04L 1/0078 |
| | | | 370/328 |
| 2020/0036615 A1 | 1/2020 | Lewis | |
| 2020/0358686 A1 | 11/2020 | Lewis | |
| 2022/0417125 A1 | 12/2022 | Lewis | |

* cited by examiner

400

METHOD AND SYSTEM FOR IMPLEMENTING HIGH AVAILABILITY (HA) WEB APPLICATION FIREWALL (WAF) FUNCTIONALITY

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing firewall functionalities, and, more particularly, to methods, systems, and apparatuses for implementing high availability ("HA") web application firewall ("WAF") functionalities.

BACKGROUND

In general, web application firewalls ("WAF's") are important components of a network defense solution. However, conventional enterprise WAF's are sold as appliances and they do not scale very well. An example company might have over 4,000 applications that each require configuration considerations—so by the time custom rules are added to accommodate the different configuration considerations of the group of applications, the traditional WAF becomes very, very slow. This ultimately affects end-user performance in a negative manner. Because of this, companies typically do not use WAF's to protect vulnerable applications or apps, but instead use WAF's to merely monitor network traffic. Put another way, a company's application-based surface is extremely wide. A single WAF solution would create significant latency and a potentially high maintenance burden.

Hence, there is a need for more robust and scalable solutions for implementing firewall functionalities, and, more particularly, to methods, systems, and apparatuses for implementing high availability ("HA") web application firewall ("WAF") functionalities.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Various embodiments provide tools and techniques for implementing firewall functionalities, and, more particularly, to methods, systems, and apparatuses for implementing high availability ("HA") web application firewall ("WAF") functionalities.

Figure 1:
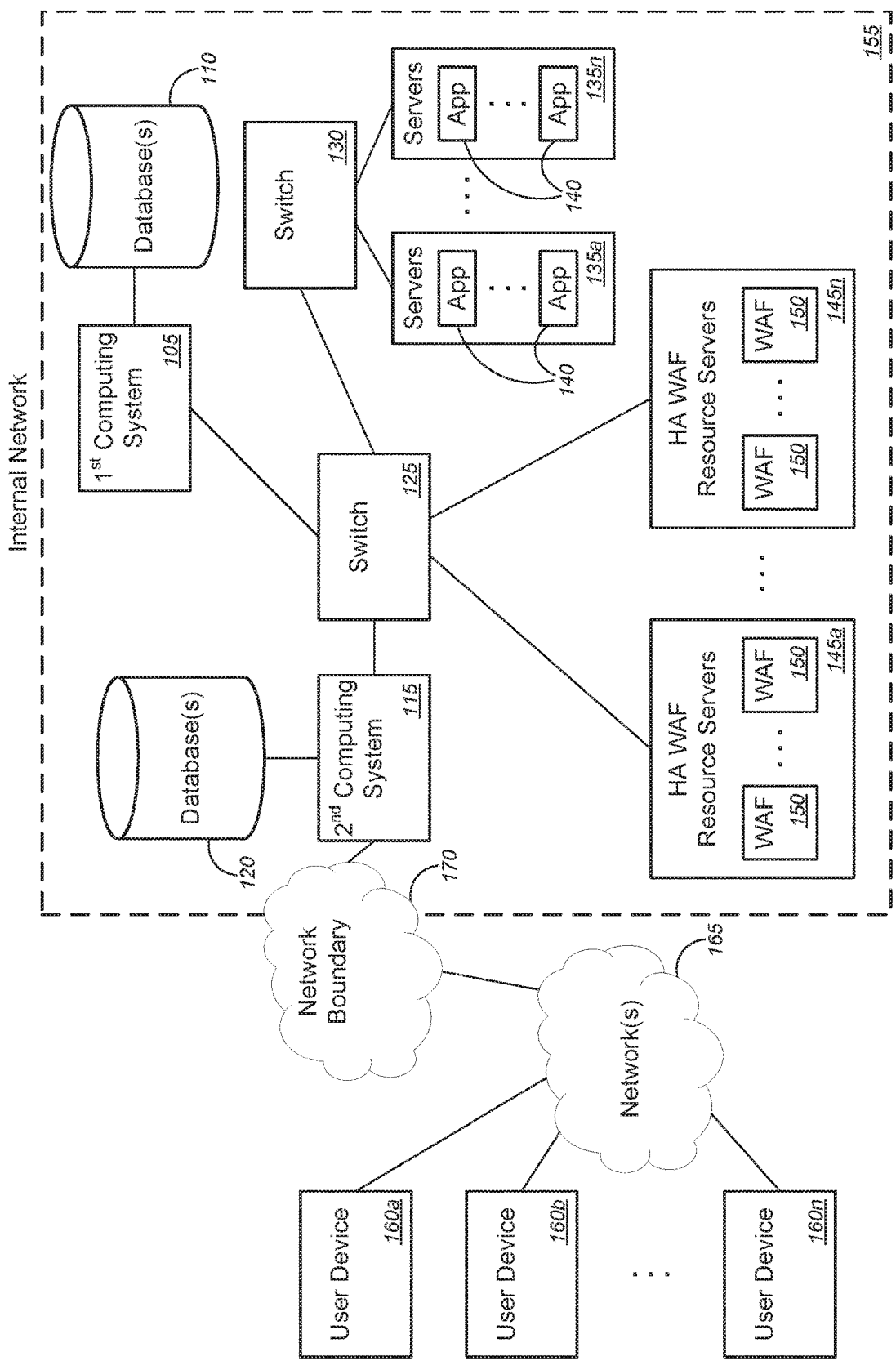
FIG. 1 is a schematic diagram illustrating a system for implementing high availability ("HA") web application firewall ("WAF") functionalities, in accordance with various embodiments.
Figure 2:
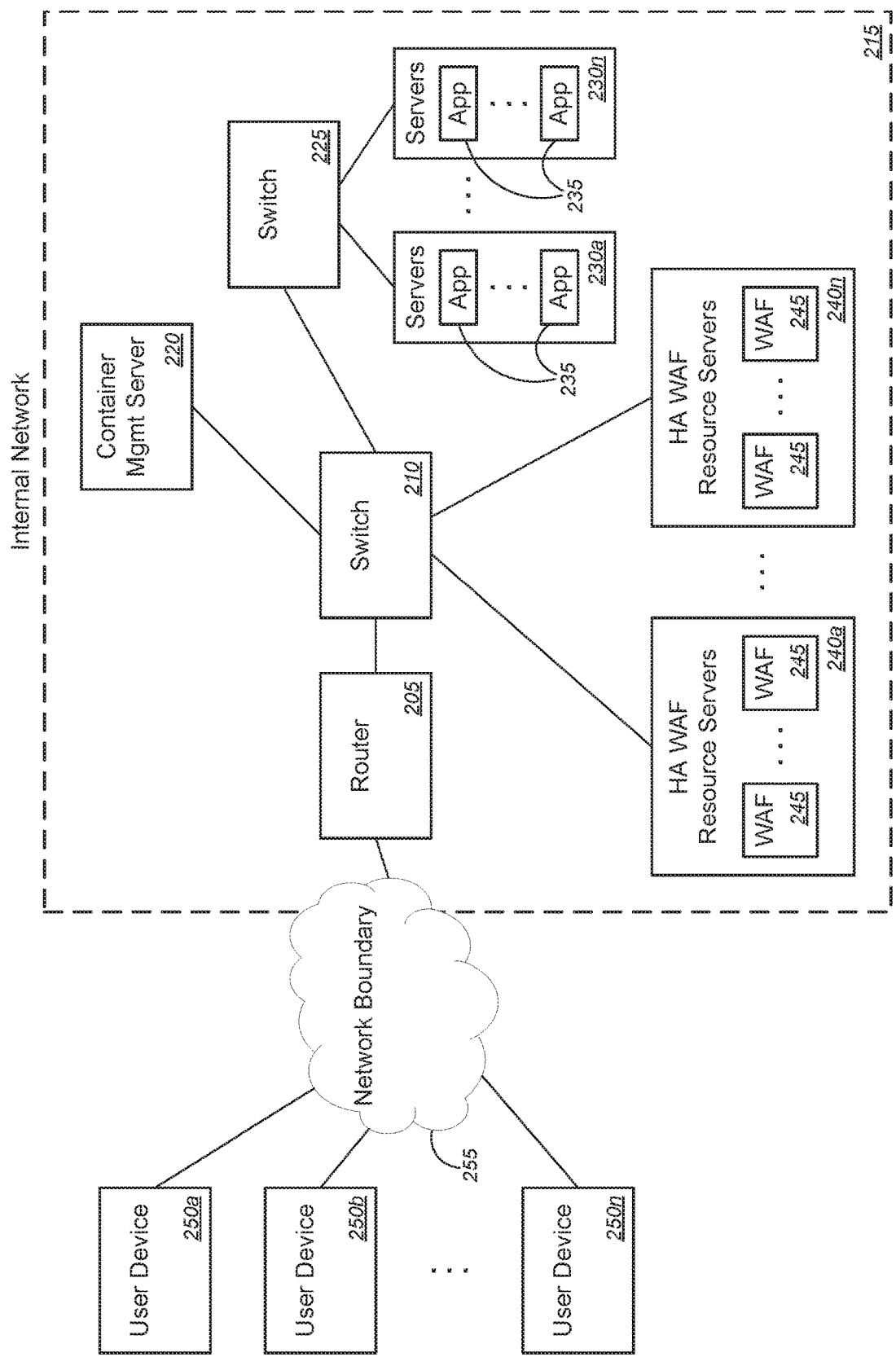
FIG. 2 is a schematic diagram illustrating another system for implementing HA WAF functionalities, in accordance with various embodiments.

In some aspects, the various embodiments utilize containers, which are light-weight virtual instances that are each fully encapsulated as a logical machine. The WAF is containerized so that a fully encapsulated WAF can run inside a container (e.g., a Docker® container, or the like). A WAF cluster is then created using container management software or systems, or the like (including, but not limited to, a Kubernetes®-based container orchestration system, or a Docker Swarm®-based container management system, or the like), so that WAF containers can be launched on demand. The container management system may be coupled with a load-balancing proxy server or a load-balancing proxy application programming interface ("API") that proactively evaluates any latency being introduced by the WAF cluster. The various embodiments might continuously invoke the proxy server or proxy API to evaluate client device latency. If latency is introduced that exceeds the acceptable threshold, the container management system might add additional WAF containers until the workload is balanced. This approach allows protection rules to be dynamically updated to accommodate changes in attack vectors in real-time (or near-real-time) without having to restart the cluster. In some embodiments, to be able to run multiple configurations simultaneously on the cluster, mini-clusters may be created inside one or more primary HA clusters. This allows multiple WAF rule sets to be run simultaneously. According to some embodiments (such as depicted in FIG. 1 or 2, or the like), a vulnerable application may be deployed behind the WAF cluster. The mini-cluster(s) might invoke a protection rule set(s) associated with the application. The container management system might monitor end-user experience and latency introduced by the WAF cluster. If latency is determined to be too high (i.e., beyond predetermined threshold values, or the like), additional WAF containers and/or additional HA WAF mini-clusters may be deployed until latency is reduced to an acceptable amount. As the workload decreases, WAF containers that become unused or underutilized may be decommissioned or deleted.

In other words, the various embodiments address the problems with conventional WAF's, by utilizing containerized WAF instances and a load balancer/proxy that auto-throttles to meet user experience requirements (i.e., minimizes latency through cluster management) and minimizes license costs (by utilizing auto-growing and auto-shrinking of WAF clusters and WAF mini-clusters, or the like). In particular, the solution comprises one or more WAF mini-clusters, each capable of protecting apps with unique rule sets that can be changed or updated dynamically to allow one to respond to newly discovered vulnerabilities without having to reboot. In some cases, the solution described herein allows each app to have its own rule set, while reducing latency, and allowing auto-scaling to accommodate varying user demand, and, in some instances, may be based on open source methodologies.

These and other functionalities are described below with respect to FIGS. 1-4.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, firewall technology, web application firewall technology, network security technology, and/or the like. In other aspects, certain embodiments can improve the functioning of user equipment or systems themselves (e.g., network firewall systems, web application firewall systems, any network deploying software as a service, any web server providing web applications to users, etc.), for example, by monitoring, with a first computing system, network communications between each client device of a plurality of client devices and at least one server among a plurality of servers providing the client devices with access to software applications, each client device being associated with a user among a plurality of users; determining, with the first computing system and based on the monitored network communications, whether latency has been introduced as a result of at least one first web application firewall ("WAF") container having been launched by a second computing system and whether any introduced latency exceeds a predetermined threshold, each first WAF container being tuned to a corresponding software application among a plurality of software applications provided by the at least one server among the plurality of servers, each first WAF container containing a fully functional and fully encapsulated WAF that protects, from network attacks, a software application to which said first WAF container is tuned; and based on a determination that latency has been introduced as a result of the at least one first WAF container having been launched and based on a determination that the introduced latency exceeds the predetermined threshold, launching, with the second computing system, one or more second WAF containers, each being tuned to the corresponding software application among the plurality of software applications; and/or the like.

In particular, to the extent any abstract concepts are present in the various embodiments, those concepts can be implemented as described herein by devices, software, systems, and methods that involve specific novel functionality (e.g., steps or operations), such as, launching WAF containers (whether as individual WAF containers, WAF containers configured in mini-clusters, WAF containers configured in WAF clusters, and/or the like) to protect software applications ("apps") that are placed behind a load-balancing proxy server or proxy application programming interface ("API") that proactively evaluates any latency being introduced by the WAF containers; if latency is introduced that exceeds a predetermined threshold, adding additional WAF containers (as individual WAF containers, to increase the number of WAF containers in existing WAF mini-clusters, to add WAF containers as configured in new WAF mini-clusters, to reorganize, rearrange, or reconfigure WAF containers in existing WAF mini-clusters or in the WAF primary cluster(s), etc.) until the workload is balanced, dynamically updating protection rules in WAF containers, concurrently implementing multiple different WAF rule sets in different WAF mini-clusters, decommissioning or deleting unused or underutilized WAF containers (and/or WAF mini-clusters, or the like) when the workload decreases (thereby releasing hardware resources for other uses), or any combination of these, and/or the like, to name a few examples, that extend beyond mere conventional computer processing operations. These functionalities can produce tangible results outside of the implementing computer system, including, merely by way of example, optimized, customized, and improved protection of vulnerable apps, and/or the like, at least some of which may be observed or measured by customers, users, and/or service providers.

In an aspect, a method might comprise launching, with a first computing system, at least one first web application firewall ("WAF") container, each being tuned to a corresponding software application among a plurality of software applications provided by at least one server among a plurality of servers, each first WAF container containing a fully functional and fully encapsulated WAF that protects, from network attacks, a software application to which said first WAF container is tuned. The method might further comprise monitoring, with a second computing system, network communications between each client device of a plurality of client devices and the at least one server among the plurality of servers providing the client devices with access to software applications, each client device being associated with a user among a plurality of users. The method might also comprise determining, with the second computing system and based on the monitored network communications, whether latency has been introduced as a result of the at least one first WAF container having been launched and whether any introduced latency exceeds a predetermined threshold; and based on a determination that latency has been introduced as a result of the at least one first WAF container having been launched and based on a determination that the introduced latency exceeds the predetermined threshold, launching, with the first computing system, one or more second WAF containers, each being tuned to the corresponding software application among the plurality of software applications. The method might comprise determining, with the second computing system and based on the monitored network communications, at least one of whether one or more client devices of the plurality of client devices are no longer accessing the corresponding software applications or whether use of hardware resources associated with the one or more software applications accessed by at least one client device among the plurality of client devices has decreased below a predetermined amount required by all implemented or launched software applications and first WAF containers. The method might further comprise, based on a determination that at least one of one or more client devices of the plurality of client devices are no longer accessing the corresponding software applications or that use of hardware resources associated with the one or more software applications accessed by at least one client device among the plurality of client devices has decreased below the predetermined amount required by all implemented or launched software applications and first WAF containers, decommissioning, with the first computing system, at least one third WAF container among a combination of the at least one first WAF container and the one or more second WAF containers.

In some embodiments, the first computing system might comprise at least one of a container orchestration system, a container orchestration server, a container management system, or a container management server, and/or the like (including, but not limited to, a Kubernetes®-based container orchestration system, or a Docker Swarm®-based container management system, or the like). According to some embodiments, the second computing system might comprise at least one of a load-balancing proxy server, a load-balancing proxy application programming interface ("API"), or a load-balancing system, and/or the like.

In another aspect, a method might comprise monitoring, with a first computing system, network communications between each client device of a plurality of client devices and at least one server among a plurality of servers providing the client devices with access to software applications, each client device being associated with a user among a plurality of users. The method might also comprise determining, with the first computing system and based on the monitored network communications, whether latency has been introduced as a result of at least one first web application firewall ("WAF") container having been launched by a second computing system and whether any introduced latency exceeds a predetermined threshold, each first WAF container being tuned to a corresponding software application among a plurality of software applications provided by the at least one server among the plurality of servers, each first WAF container containing a fully functional and fully encapsulated WAF that protects, from network attacks, a software application to which said first WAF container is tuned. The method might further comprise, based on a determination that latency has been introduced as a result of the at least one first WAF container having been launched and based on a determination that the introduced latency exceeds the predetermined threshold, launching, with the second computing system, one or more second WAF containers, each being tuned to the corresponding software application among the plurality of software applications.

According to some embodiments, the first computing system might comprise at least one of a load-balancing proxy server, a load-balancing proxy application programming interface ("API"), or a load-balancing system, and/or the like. In some embodiments, the second computing system might comprise at least one of a container orchestration system, a container orchestration server, a container management system, or a container management server, and/or the like (including, but not limited to, a Kubernetes®-based container orchestration system, or a Docker Swarm®-based container management system, or the like). In some cases, the first computing system and the second computing system might be disposed within the same computing system.

Merely by way of example, in some instances, the at least one first WAF container might comprise at least one first WAF cluster, each first WAF cluster comprising a cluster of two or more first WAF containers. In some cases, one or more of the at least one first WAF cluster might each comprise at least one first WAF mini cluster, each first WAF mini cluster comprising two or more first WAF containers, wherein each first WAF mini cluster might be configured to apply a WAF rule, wherein the first WAF cluster might be configured to apply multiple WAF rules using different first WAF mini clusters. According to some embodiments, launching one or more second WAF containers might comprise launching one or more second WAF containers in at least one of one or more second WAF clusters or one or more second WAF mini clusters, wherein each second WAF mini cluster might be configured to apply a WAF rule, wherein the second WAF cluster might be configured to apply multiple WAF rules using different second WAF mini clusters. In some instances, the method might further comprise launching, with the second computing system, the at least one first WAF container.

In some embodiments, the method might further comprise determining, with the first computing system and based on the monitored network communications, at least one of whether one or more client devices of the plurality of client devices are no longer accessing the corresponding software applications or whether use of hardware resources associated with the one or more software applications accessed by at least one client device among the plurality of client devices has decreased below a predetermined amount required by all implemented or launched software applications and first WAF containers. In some cases, the method might further comprise, based on a determination that at least one of one or more client devices of the plurality of client devices are no longer accessing the corresponding software applications or that use of hardware resources associated with the one or more software applications accessed by at least one client device among the plurality of client devices has decreased below the predetermined amount required by all implemented or launched software applications and first WAF containers, decommissioning, with the second computing system, at least one third WAF container among a combination of the at least one first WAF container and the one or more second WAF containers.

According to some embodiments, the method might further comprise receiving, with the first computing system and from a first client device among the plurality of client devices, a request to access a first software application among the plurality of software applications; sending, with the first computing system and to the second computing system, a request to launch a WAF container that is tuned to the first software application; and in response to receiving the request to launch the WAF container that is tuned to the first software application, launching, with the second computing system, at least one fourth WAF container that is tuned to the first software application, the at least one fourth WAF container containing a fully functional and fully encapsulated WAF that protects, from network attacks, the first software application to which said at least one fourth WAF container is tuned. The method might also comprise monitoring, with the at least one fourth WAF container, network communications between the first client device and at least one of the second computing system or the at least one fourth WAF container; and based on the monitored network communications between the first client device and the at least one of the second computing system or the at least one fourth WAF container, determining, with the at least one fourth WAF container, whether said network communications contains indications of network attacks targeting the first software application.

The method might further comprise, based on a determination that the network communications between the first client device and the at least one of the second computing system or the at least one fourth WAF container contains indications of one or more network attacks targeting the first software application, performing at least one of: blocking, with the at least one fourth WAF container, access to the first software application by the first client device; initiating, with the at least one fourth WAF container, one or more counter-measures against the one or more network attacks; updating, with the second computing system, one or more first protection rules in the at least one fourth WAF container to address the one or more network attacks; or implementing, with the second computing system, one or more second protection rules in the at least one fourth WAF container to address the one or more network attacks; and/or the like. The method might further comprise, based on a determination that the network communications between the first client device and the at least one of the second computing system or the at least one fourth WAF container do not contain indications of one or more network attacks targeting the first software application, providing, with the at least one fourth WAF container, the first client device with access to the first software application.

In some embodiments, monitoring network communications between the first client device and the at least one of the second computing system or the at least one fourth WAF container might comprise dynamically monitoring in real-time, with the at least one fourth WAF container, network communications between the first client device and the at least one of the second computing system or the at least one fourth WAF container. The method might further comprise, based on the dynamically monitored network communications between the first client device and the at least one of the second computing system or the at least one fourth WAF container, determining, with the at least one fourth WAF container, whether said network communications contains indications of additional network attacks targeting the first software application; and based on a determination that the network communications between the first client device and the at least one of the second computing system or the at least one fourth WAF container contains indications of one or more additional network attacks targeting the first software application, dynamically updating in real-time, with the second computing system, at least one of the one or more first protection rules or the one or more second protection rules in the at least one fourth WAF container to accommodate the one or more additional network attacks, without restarting the at least one fourth container.

In some instances, at least one of the one or more first protection rules or the one or more second protection rules might be stored in or retrieved from a rules repository.

In yet another aspect, a system might comprise a first computing system and a second computing system. The first computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first computing system to: monitor network communications between each client device of a plurality of client devices and at least one server among a plurality of servers providing the client devices with access to software applications, each client device being associated with a user among a plurality of users; and determine, based on the monitored network communications, whether latency has been introduced as a result of at least one first web application firewall ("WAF") container having been launched by a second computing system and whether any introduced latency exceeds a predetermined threshold, each first WAF container being tuned to a corresponding software application among a plurality of software applications provided by the at least one server among the plurality of servers, each first WAF container containing a fully functional and fully encapsulated WAF that protects, from network attacks, a software application to which said first WAF container is tuned.

The second computing system might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second computing system to: based on a determination that latency has been introduced as a result of the at least one first WAF container having been launched and based on a determination that the introduced latency exceeds the predetermined threshold, launch one or more second WAF containers, each being tuned to the corresponding software application among the plurality of software applications.

According to some embodiments, the first computing system might comprise at least one of a load-balancing proxy server, a load-balancing proxy application programming interface ("API"), or a load-balancing system, and/or the like. In some embodiments, the second computing system might comprise at least one of a container orchestration system, a container orchestration server, a container management system, or a container management server, and/or the like (including, but not limited to, a Kubernetes®-based container orchestration system, or a Docker Swarm®-based container management system, or the like).

In some cases, the second set of instructions, when executed by the at least one second processor, might further cause the second computing system to: launch the at least one first WAF container.

In some instances, the first set of instructions, when executed by the at least one first processor, might further cause the first computing system to: determine, based on the monitored network communications, at least one of whether one or more client devices of the plurality of client devices are no longer accessing the corresponding software applications or whether use of hardware resources associated with the one or more software applications accessed by at least one client device among the plurality of client devices has decreased below a predetermined amount required by all implemented or launched software applications and first WAF containers. The second set of instructions, when executed by the at least one second processor, might further cause the second computing system to: based on a determination that at least one of one or more client devices of the plurality of client devices are no longer accessing the corresponding software applications or use of hardware resources associated with the one or more software applications accessed by at least one client device among the plurality of client devices has decreased below the predetermined amount required by all implemented or launched software applications and first WAF containers, decommission at least one third WAF container among a combination of the at least one first WAF container and the one or more second WAF containers.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing firewall functionalities, and, more particularly, to methods, systems, and apparatuses for implementing high availability ("HA") web application firewall ("WAF") functionalities, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing high availability ("HA") web application firewall ("WAF") functionalities, in accordance with various embodiments.

In the non-limiting embodiment of FIG. 1, system 100 might comprise a first computing system 105 and corresponding data store(s) or database(s) 110 and a second computing system 115 and corresponding data store(s) or database(s) 120. In some embodiments, the first computing system 105 might include, without limitation, at least one of a container orchestration system, a container orchestration server, a container management system, or a container management server, and/or the like (including, but not limited to, a Kubernetes®-based container orchestration system, or a Docker Swarm®-based container management system, or the like). According to some embodiments, the second computing system 115 might include, but is not limited to, at least one of a load-balancing proxy server, a load-balancing proxy application programming interface ("API"), or a load-balancing system, and/or the like. In some cases, the first computing system 105 and the second computing system 115 might be disposed within the same computing system.

In some embodiments, system 100 might further comprise switch 125, switch 130, one or more servers 135a-135n (collectively, "servers 135" or the like) containing one or more software applications 140 (also referred to as "apps"), one or more HA WAF resource servers 145a-145n (collectively, "HA WAF resource servers 145," "resource servers 145," or the like) containing one or more WAF containers 150, and/or the like. According to some embodiments, the first computing system 105, the second computing system 115, the databases 110 and 120, the switches 125 and 130, the servers 135, and the resource servers 145, and/or the like, might be disposed within an internal network 155, which might be associated with at least one of a private company, a public company, a customer, a service provider, and/or the like. In some cases, the system 100 might further comprise user devices 160a-160n (collectively, "user devices 160" or the like), one or more networks 165, and network boundary 170 (which might provide the one or more networks 165 with access to the internal network 155), and/or the like.

In operation, one or more user devices 160 of the user devices 160a-160n might independently or separately access (or might attempt or request to access) at least one application 140 among the one or more applications 140. The second computing system 115 might serve as a proxy server to intercept network communications from the one or more user devices 160 (including requests to access the at least one application 140, potential attacks, etc.). The second computing system 115 and/or the first computing system 105 might monitor said network communications, and might determine whether said network communications contain indications of one or more network attacks targeting the at least one application 140. Based on a determination that the network communications contain indications of one or more network attacks targeting the at least one application 140, the first computing system 105 might control or manage (via switch 125, which is controlled by the second computing system 115) at least one of HA WAF resource servers 145 and/or WAF containers 150 (which might be configured in clusters or mini-clusters of WAF containers 150) to perform at least one of: blocking access to the at least one application 140 by the one or more user devices 160; initiating one or more counter-measures against the one or more network attacks; updating one or more existing protection rules in at least one of the WAF containers 150 and/or in at least one of the HA WAF mini-clusters or the HA WAF cluster to address the one or more network attacks; or implementing one or more new protection rules in at least one of the WAF containers 150 and/or in at least one of the HA WAF mini-clusters or the HA WAF cluster to address the one or more network attacks; and/or the like. In some embodiments, at least one of the one or more existing protection rules or the one or more new protection rules might be stored in or retrieved from a rules repository (which might be embodied in a database such as, but not limited to, database(s) 110 and 120, or the like). Based on a determination that the network communications do not contain indications of network attacks targeting the web application 140, the first computing system 105 might control or manage the HA WAF cluster, the HA WAF mini-cluster(s), and/or the WAF containers 150 to provide the unblocked at least one of the one or more user devices 160 with access to the at least one application 140 via switch 125 (which is controlled by the second computing system 115), via switch 130 (which controls access to the corresponding server(s) 135 on which the at least one application 140 might be disposed or contained). In some embodiments, monitoring the network communications might comprise dynamically monitoring (in some cases, in real-time or near real-time) the network communications.

According to some embodiments, the first computing system 105 might, based on the monitored network communications, determine whether latency has been introduced as a result of the plurality of WAF containers 150 having been launched—and/or as a result of active WAF containers 150 and/or mini-clusters of WAF containers 150 having been overwhelmed by one or more of excess user devices 160 attempting to access the at least one application 140, an increased number of attacks targeting the at least one application 140, and/or different types of attacks targeting the at least one application 140, or the like—and based on a determination that the introduced latency exceeds the predetermined threshold. Here, "latency" might refer to the round-trip time for the web application server to respond to a user's request. For example, a threshold can be set requiring responses to be received within a 300 millisecond time interval from the original web request. Therefore, the WAF must auto-grow the WAF mini-cluster until it can respond to the number of requests, while interrogating the packets, without introducing latency beyond this threshold. In some embodiments, the predetermined threshold might include, without limitation, 10 milliseconds, 20 milliseconds, 30 milliseconds, 40 milliseconds, 50 milliseconds, 100 milliseconds, 150 milliseconds, 200 milliseconds, 250 milliseconds, 300 milliseconds, 350 milliseconds, 400 milliseconds, 450 milliseconds, 500 milliseconds, or greater. Based on a determination that latency has been introduced as a result of at least one WAF container having been launched—and/or as a result of active WAF containers 150 and/or mini-clusters of WAF containers 150 having been overwhelmed by one or more of excess user devices 160 attempting to access the at least one application 140, an increased number of attacks targeting the at least one application 140, and/or different types of attacks targeting the at least one application 140, or the like—and based on a determination that the introduced latency exceeds the predetermined threshold, the first computing system might launch one or more additional WAF containers and/or one or more HA WAF mini-clusters (and/or might reconfigure existing WAF containers 150 and/or existing HA WAF mini-clusters of WAF containers 150, or the like), each being tuned to the at least one application 140.

In some embodiments, the first computing system 105 might, based on the monitored network communications, determine at least one of whether one or more user devices 160 of the plurality of user devices 160 are no longer accessing the at least one application 140 or whether use of hardware resources associated with the at least one application 140 accessed by at least one user device 160 among the plurality of user devices 160 has decreased below a predetermined amount required by the at least one application 140 and at least one of the HA WAF cluster, the HA WAF mini-cluster(s), and/or the WAF containers 150. Based on a determination that at least one of one or more user devices 160 of the plurality of user devices 160 are no longer accessing the at least one application 140 or that use of hardware resources associated with the at least one application 140 accessed by at least one user device 160 among the plurality of user devices 160 has decreased below the predetermined amount required by the at least one application 140 and at least one of the HA WAF cluster, the HA WAF mini-cluster(s), and/or the WAF containers 150, the HA WAF cluster or the first computing system 105 might decommission at least one WAF container 150 and/or at least one HA WAF mini-cluster. In this case, user devices 160 no longer access (or attempt to access) the at least one application 140. As a result, use of hardware resources associated with the at least one application 140 and/or hardware resources associated with the HA WAF cluster, the HA WAF mini-cluster(s), and/or the WAF containers 150 has decreased below an amount required by the at least one application 140 and/or the HA WAF cluster, the HA WAF mini-cluster(s), and/or the WAF containers 150 (i.e., leaving at least some of the HA WAF mini-cluster(s) and/or the WAF containers 150 idle or underutilized, or the like). In response to determining reduced use of hardware resources, the HA WAF cluster or the first computing system 105 might decommission or delete HA WAF mini-cluster(s) and/or WAF containers 150.

In some aspects, the various embodiments utilize containers, which are light-weight virtual instances that are each fully encapsulated as a logical machine. The WAF is containerized so that a fully encapsulated WAF can run inside a container (e.g., a Docker® container, or the like). A WAF cluster is then created using container management software or systems, or the like (including, but not limited to, a Kubernetes®-based container orchestration system, or a Docker Swarm®-based container management system, or the like), so that WAF containers can be launched on demand. The container management system may be coupled with a load-balancing proxy server or a load-balancing proxy application programming interface ("API") that proactively evaluates any latency being introduced by the WAF cluster. The various embodiments might continuously invoke the proxy server or proxy API to evaluate client device latency. If latency is introduced that exceeds the acceptable threshold, the container management system might add additional WAF containers until the workload is balanced. This approach allows protection rules to be dynamically updated to accommodate changes in attack vectors in real-time (or near-real-time) without having to restart the cluster. In some embodiments, to be able to run multiple configurations simultaneously on the cluster, mini-clusters may be created inside one or more primary HA clusters. This allows multiple WAF rule sets to be run simultaneously. According to some embodiments (such as depicted in FIG. 1, or the like), a vulnerable application may be deployed behind the WAF cluster. The mini-cluster(s) might invoke a protection rule set(s) associated with the application. The container management system might monitor end-user experience and latency introduced by the WAF cluster. If latency is determined to be too high (i.e., beyond predetermined threshold values, or the like), additional WAF containers and/or additional HA WAF mini-clusters may be deployed until latency is reduced to an acceptable amount. As the workload decreases, WAF containers that become unused or underutilized may be decommissioned or deleted.

In other words, the various embodiments address the problems with conventional WAF's, by utilizing containerized WAF instances and a load balancer/proxy that auto-throttles to meet user experience requirements (i.e., minimizes latency through cluster management) and minimizes license costs (by utilizing auto-growing and auto-shrinking of WAF clusters and WAF mini-clusters, or the like). In particular, the solution comprises one or more WAF mini-clusters, each capable of protecting apps with unique rule sets that can be changed or updated dynamically to allow one to respond to newly discovered vulnerabilities without having to reboot. In some cases, the solution described herein allows each app to have its own rule set, while reducing latency, and allowing auto-scaling to accommodate varying user demand, and, in some instances, may be based on open source methodologies. These and other functionalities are described below with respect to FIGS. 2-4D.

FIG. 2 is a schematic diagram illustrating another system 200 for implementing HA WAF functionalities, in accordance with various embodiments.

In the non-limiting embodiment of FIG. 2, system 200 might comprise a router 205 (which, in some cases, might correspond to the second computing system 115 and corresponding data store(s) or database(s) 120 of FIG. 1, or the like) and a switch 210 (which might correspond to switch 125 of FIG. 1, or the like), which might both be disposed within an internal network 215, which might be associated with at least one of a private company, a public company, a customer, a service provider, and/or the like. System 200 might further comprise a container management server 220 (which, in some cases, might correspond to the first computing system 105 and corresponding data store(s) or database(s) 110 of FIG. 1, or the like). According to some embodiments, the router 205 might include, but is not limited to, at least one of a load-balancing proxy server, a load-balancing proxy application programming interface ("API"), or a load-balancing system, and/or the like. In some embodiments, the container management server 220 might include, without limitation, at least one of a container orchestration system, a container orchestration server, a container management system, or a container management server, and/or the like (including, but not limited to, a Kubernetes®-based container orchestration system, or a Docker Swarm®-based container management system, or the like). In some cases, the router 205 and the container management server 220 might be disposed within the same computing system.

In some embodiments, system 200 might further comprise switch 225, one or more servers 230a-230n (collectively, "servers 230" or the like) containing one or more software applications 235, one or more HA WAF resource servers 240a-240n (collectively, "HA WAF resource servers 240," "resource servers 240," or the like) containing one or more WAF containers 245, and/or the like. According to some embodiments, the router 205, the container management server 220, the switches 210 and 225, the servers 230, and the resource servers 240, and/or the like, might be disposed within the internal network 215. In some cases, the system 200 might further comprise user devices 250a-250n (collectively, "user devices 250" or the like), and network boundary 255 (which might provide the user devices 250 with access to the internal network 215), and/or the like.

In operation, one or more user devices 250 of the user devices 250a-250n might independently or separately access (or might attempt or request to access) at least one application 235 among the one or more applications 235. The router 205 might serve as a proxy server to intercept network communications from the one or more user devices 250 (including requests to access the at least one application 235, potential attacks, etc.). The router 205 and/or the container management server 220 might monitor said network communications, and might determine whether said network communications contain indications of one or more network attacks targeting the at least one application 235. Based on a determination that the network communications contain indications of one or more network attacks targeting the at least one application 235, the container management server 220 might control or manage (via switch 210, which is controlled by the router 205) at least one of HA WAF resource servers 240 and/or WAF containers 245 (which might be configured in clusters or mini-clusters of WAF containers 245) to perform at least one of: blocking access to the at least one application 235 by the one or more user devices 250; initiating one or more counter-measures against the one or more network attacks; updating one or more existing protection rules in at least one of the WAF containers 245 and/or in at least one of the HA WAF mini-clusters or the HA WAF cluster to address the one or more network attacks; or implementing one or more new protection rules in at least one of the WAF containers 245 and/or in at least one of the HA WAF mini-clusters or the HA WAF cluster to address the one or more network attacks; and/or the like. In some embodiments, at least one of the one or more existing protection rules or the one or more new protection rules might be stored in or retrieved from a rules repository (which might be embodied in a database such as, but not limited to, database(s) 110 and 120 in FIG. 1, or the like). Based on a determination that the network communications do not contain indications of network attacks targeting the web application 235, the container management server 220 might control or manage the HA WAF cluster, the HA WAF mini-cluster(s), and/or the WAF containers 245 to provide the unblocked at least one of the one or more user devices 250 with access to the at least one application 235 via switch 210 (which is controlled by the router 205), via switch 225 (which controls access to the corresponding server(s) 230 on which the at least one application 235 might be disposed or contained). In some embodiments, monitoring the network communications might comprise dynamically monitoring (in some cases, in real-time or near real-time) the network communications.

According to some embodiments, the container management server 220 might, based on the monitored network communications, determine whether latency has been introduced as a result of the plurality of WAF containers 245 having been launched— and/or as a result of active WAF containers 245 and/or mini-clusters of WAF containers 245 having been overwhelmed by one or more of excess user devices 250 attempting to access the at least one application 235, an increased number of attacks targeting the at least one application 235, and/or different types of attacks targeting the at least one application 235, or the like—and based on a determination that the introduced latency exceeds the predetermined threshold. Based on a determination that latency has been introduced as a result of at least one WAF container having been launched—and/or as a result of active WAF containers 245 and/or mini-clusters of WAF containers 245 having been overwhelmed by one or more of excess user devices 250 attempting to access the at least one application 235, an increased number of attacks targeting the at least one application 235, and/or different types of attacks targeting the at least one application 235, or the like—and based on a determination that the introduced latency exceeds the predetermined threshold, the container management server 220 might launch one or more additional WAF containers and/or one or more HA WAF mini-clusters (and/or might reconfigure existing WAF containers 245 and/or existing HA WAF mini-clusters of WAF containers 245, or the like), each being tuned to the at least one application 235.

In some embodiments, the container management server 220 might, based on the monitored network communications, determine at least one of whether one or more user devices 250 of the plurality of user devices 250 are no longer accessing the at least one application 235 or whether use of hardware resources associated with the at least one application 235 accessed by at least one user device 250 among the plurality of user devices 250 has decreased below a predetermined amount required by the at least one application 235 and at least one of the HA WAF cluster, the HA WAF mini-cluster(s), and/or the WAF containers 245. Based on a determination that at least one of one or more user devices 250 of the plurality of user devices 250 are no longer accessing the at least one application 235 or that use of hardware resources associated with the at least one application 235 accessed by at least one user device 250 among the plurality of user devices 250 has decreased below the predetermined amount required by the at least one application 235 and at least one of the HA WAF cluster, the HA WAF mini-cluster(s), and/or the WAF containers 245, the HA WAF cluster or the container management server 220 might decommission at least one WAF container 245 and/or at least one HA WAF mini-cluster. In this case, user devices 250 no longer access (or attempt to access) the at least one application 235. As a result, use of hardware resources associated with the at least one application 235 and/or hardware resources associated with the HA WAF cluster, the HA WAF mini-cluster(s), and/or the WAF containers 245 has decreased below an amount required by the at least one application 235 and/or the HA WAF cluster, the HA WAF mini-cluster(s), and/or the WAF containers 245 (i.e., leaving at least some of the HA WAF mini-cluster(s) and/or the WAF containers 245 idle or underutilized, or the like). In response to determining reduced use of hardware resources, the HA WAF cluster or the container management server 220 might decommission or delete HA WAF mini-cluster(s) and/or WAF containers 245.

In some aspects, the various embodiments utilize containers, which are light-weight virtual instances that are each fully encapsulated as a logical machine. The WAF is containerized so that a fully encapsulated WAF can run inside a container (e.g., a Docker® container, or the like). A WAF cluster is then created using container management software or systems, or the like (including, but not limited to, a Kubernetes®-based container orchestration system, or a Docker Swarm®-based container management system, or the like), so that WAF containers can be launched on demand. The container management system may be coupled with a load-balancing proxy server or a load-balancing proxy application programming interface ("API") that proactively evaluates any latency being introduced by the WAF cluster. The various embodiments might continuously invoke the proxy server or proxy API to evaluate client device latency. If latency is introduced that exceeds the acceptable threshold, the container management system might add additional WAF containers until the workload is balanced. This approach allows protection rules to be dynamically updated to accommodate changes in attack vectors in real-time (or near-real-time) without having to restart the cluster. In some embodiments, to be able to run multiple configurations simultaneously on the cluster, mini-clusters may be created inside one or more primary HA clusters. This allows multiple WAF rule sets to be run simultaneously. According to some embodiments (such as depicted in FIG. 2, or the like), a vulnerable application may be deployed behind the WAF cluster. The mini-cluster(s) might invoke a protection rule set(s) associated with the application. The container management system might monitor end-user experience and latency introduced by the WAF cluster. If latency is determined to be too high (i.e., beyond predetermined threshold values, or the like), additional WAF containers and/or additional HA WAF mini-clusters may be deployed until latency is reduced to an acceptable amount. As the workload decreases, WAF containers that become unused or underutilized may be decommissioned or deleted.

In other words, the various embodiments address the problems with conventional WAF's, by utilizing containerized WAF instances and a load balancer/proxy that auto-throttles to meet user experience requirements (i.e., minimizes latency through cluster management) and minimizes license costs (by utilizing auto-growing and auto-shrinking of WAF clusters and WAF mini-clusters, or the like). In particular, the solution comprises one or more WAF mini-clusters, each capable of protecting apps with unique rule sets that can be changed or updated dynamically to allow one to respond to newly discovered vulnerabilities without having to reboot. In some cases, the solution described herein allows each app to have its own rule set, while reducing latency, and allowing auto-scaling to accommodate varying user demand, and, in some instances, may be based on open source methodologies. These and other functionalities are described below with respect to FIGS. 3A-4D.

Figure 3A:
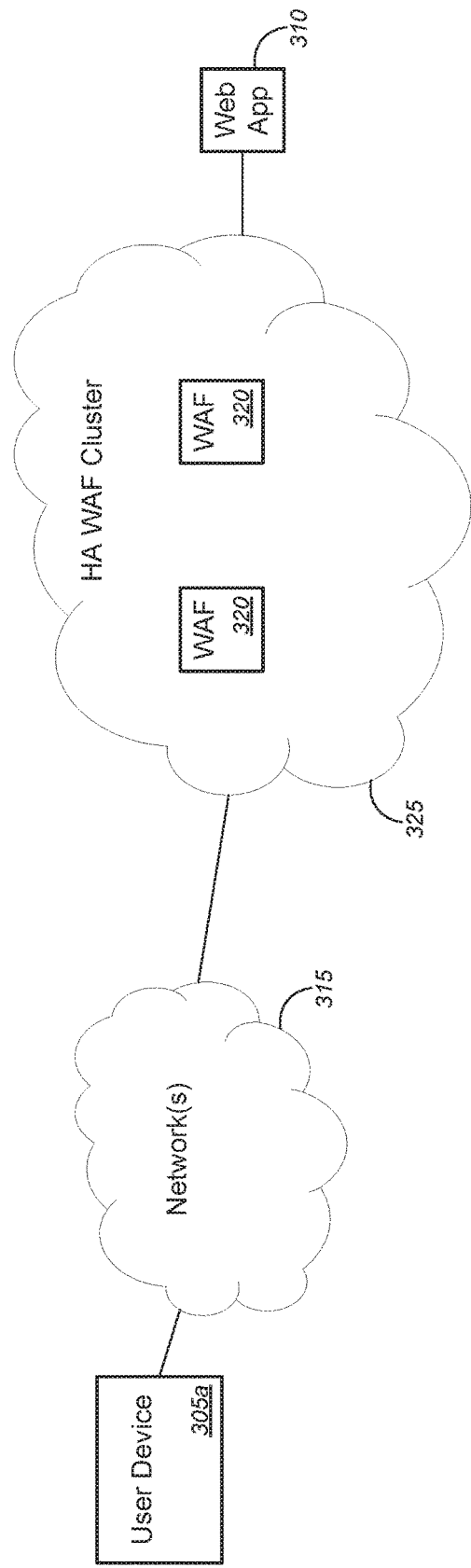
FIGS. 3A-3C are schematic diagrams illustrating different examples of configurations of a HA WAF Cluster that may be used for implementing HA WAF functionalities at different times of a day or in response to different levels of requests for access to applications by users via user devices, in accordance with various embodiments.
Figure 3B:
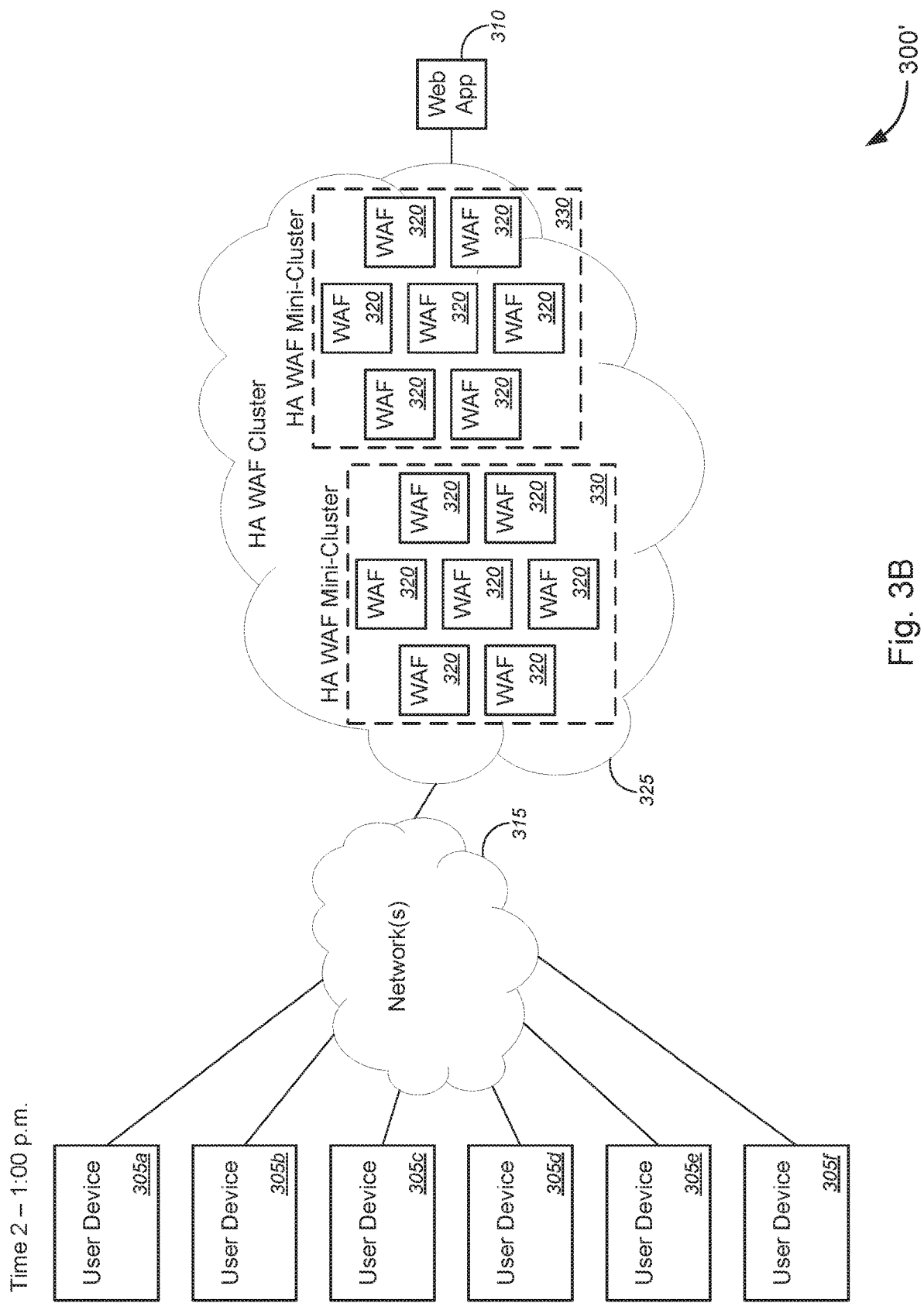
Figure 3C:
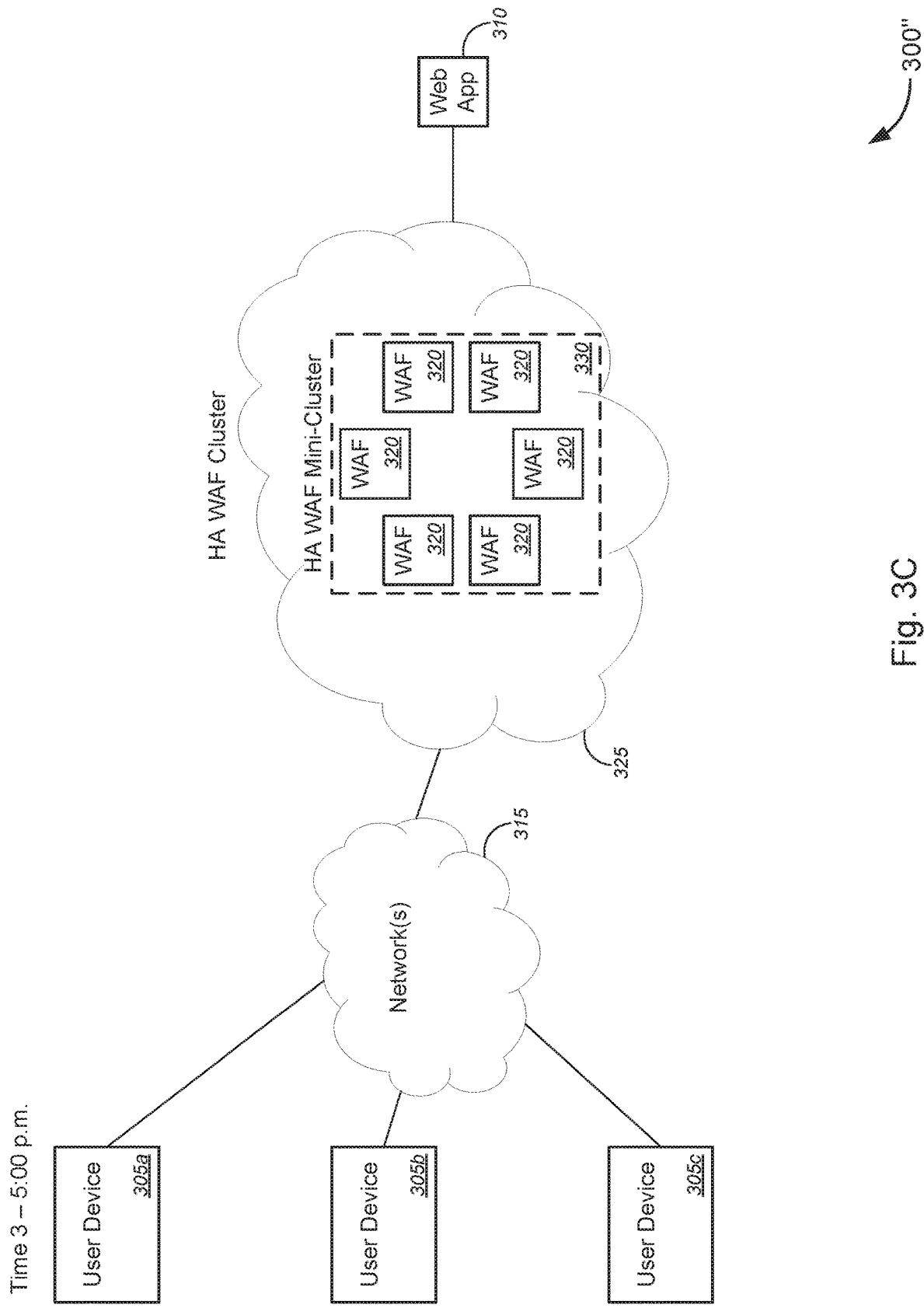

FIGS. 3A-3C (collectively, "FIG. 3") are schematic diagrams illustrating different examples of configurations 300, 300', and 300" of a HA WAF Cluster that may be used for implementing HA WAF functionalities at different times of a day or in response to different levels of requests for access to applications by users via user devices. Herein, the particular network configurations and times of day are provided merely for purposes of illustration. As such, the various embodiments are not limited to the particular network configurations and times of day, but may be configured or reconfigured in any manner as determined by the intelligent network services automation system as necessary and/or as desired. Although not expressly shown, rather than times of day, a higher or lower level of requests by users (i.e., greater or lesser number of requests) to access applications via user devices and networks may be the basis by which configuration or reconfiguration of the network may be made.

In the non-limiting embodiment of FIG. 3A, at time 1 (e.g., at 9:00 a.m.), in a first configuration 300, the system might comprise a first user device 305a, a web application 310, one or more networks 315, a plurality of WAF containers 320 (two being shown in FIG. 3A) in a HA WAF cluster 325. In the first configuration 300, the first user device 305a might access (or might attempt or request to access) the web application 310 via the one or more networks 315 and the HA WAF cluster 325 containing the plurality of WAF containers 320. In response to the first user device 305a sending a request to access the web application 310, the HA WAF cluster 325 and/or the WAF containers 320 contained within HA WAF cluster 325 might monitor network communications between the first user device 305a and the HA WAF cluster 325 and/or the WAF containers 320, and might determine whether said network communications contain indications of one or more network attacks targeting the web application 310. Based on a determination that the network communications contain indications of one or more network attacks targeting the web application 310, the HA WAF cluster 325 and/or the WAF containers 320 might perform at least one of: blocking access to the web application 310 by the first user device 305a; initiating one or more counter-measures against the one or more network attacks; updating one or more protection rules in at least one of the WAF containers 320 to address the one or more network attacks; or implementing one or more new protection rules in at least one of the WAF containers 320 to address the one or more network attacks; and/or the like. Based on a determination that the network communications do not contain indications of network attacks targeting the web application 310, the HA WAF cluster 325 and/or the WAF containers 320 might provide the first user device 305a with access to the web application 310. In some embodiments, monitoring the network communications might comprise dynamically monitoring (in some cases, in real-time or near real-time) the network communications.

With reference to the non-limiting embodiment of FIG. 3B, at time 2 (e.g., at 1:00 p.m.), in a second configuration 300', the system might comprise a plurality of user devices 305a-305f (six being shown in FIG. 3B; collectively, "user devices 305" or the like), the web application 310, the one or more networks 315, a plurality of WAF containers 320 (fourteen being shown in FIG. 3B) in one or more HA WAF mini-clusters 330 (two being shown in FIG. 3B, each mini-cluster 330 containing seven WAF containers 320 in the non-limiting embodiment of FIG. 3B), the one or more HA WAF mini-clusters 330 being disposed in the HA WAF cluster 325. In the second configuration 300', each of the first through sixth user devices 305a-305f might independently or separately access (or might attempt or request to access) the web application 310 via the one or more networks 315 and the HA WAF cluster 325 containing the one or more HA WAF mini-cluster 330 each containing WAF containers 320. In response to multiple user devices 305a-305f sending (independent or separate) requests to access the web application 310, the HA WAF cluster 325, the HA WAF mini-cluster(s) 330, and/or the WAF containers 320 might monitor network communications between each of the user devices 305a-305f and the HA WAF cluster 325, the HA WAF mini-cluster(s) 330, and/or the WAF containers 320, and might determine whether said network communications contain indications of one or more network attacks targeting the web application 310. Based on a determination that the network communications contain indications of one or more network attacks targeting the web application 310, the HA WAF cluster 325, the HA WAF mini-cluster(s) 330, and/or the WAF containers 320 might perform at least one of: blocking access to the web application 310 by one or more of the user devices 305a-305f; initiating one or more counter-measures against the one or more network attacks; updating one or more protection rules in at least one of the WAF containers 320 and/or in at least one of the HA WAF mini-clusters 330 to address the one or more network attacks; or implementing one or more new protection rules in at least one of the WAF containers 320 and/or in at least one of the HA WAF mini-clusters 330 to address the one or more network attacks; and/or the like. Based on a determination that the network communications do not contain indications of network attacks targeting the web application 310, the HA WAF cluster 325, the HA WAF mini-cluster(s) 330, and/or the WAF containers 320 might provide the unblocked one or more of the user devices 305a-305f with access to the web application 310. In some embodiments, monitoring the network communications might comprise dynamically monitoring (in some cases, in real-time or near real-time) the network communications.

According to some embodiments, the HA WAF cluster 325 or a container management server (e.g., the container management server 220 of FIG. 2 or the first computing system 105 of FIG. 1, or the like) that controls and/or manages the HA WAF cluster 325 might, based on the monitored network communications, determine whether latency has been introduced as a result of the plurality of WAF containers 320 having been launched—and/or as a result of active WAF containers 320 and/or mini-clusters 330 having been overwhelmed by one or more of excess user devices 305 attempting to access the web application 310, an increased number of attacks targeting the web application 310, and/or different types of attacks targeting the web application 310, or the like—and based on a determination that the introduced latency exceeds the predetermined threshold. Based on a determination that latency has been introduced as a result of at least one first WAF container having been launched—and/or as a result of active WAF containers 320 and/or mini-clusters 330 having been overwhelmed by one or more of excess user devices 305 attempting to access the web application 310, an increased number of attacks targeting the web application 310, and/or different types of attacks targeting the web application 310, or the like—and based on a determination that the introduced latency exceeds the predetermined threshold, the HA WAF cluster 325 or the container management server (not shown in FIG. 3) might launch one or more additional WAF containers and/or one or more HA WAF mini-clusters (and/or might reconfigure existing WAF containers 320 and/or existing HA WAF mini-clusters 330, or the like), each being tuned to the web application 310. This is illustrated, for example, with respect to the addition of WAF containers 320 and/or HA WAF mini-clusters 330 (as shown in FIG. 3B) compared with the network configuration of WAF containers 320 (as shown in FIG. 3A) due to the increased number of user devices requesting or attempting to access the web application 310 (as depicted in FIG. 3B compared with the number of user devices shown in FIG. 3A), or the like.

With reference to the non-limiting embodiment of FIG. 3C, at time 3 (e.g., at 5:00 p.m.), in a third configuration 300", the system might comprise a plurality of user devices 305a-305c (three being shown in FIG. 3C; collectively, "user devices 305" or the like), the web application 310, the one or more networks 315, a plurality of WAF containers 320 (six being shown in FIG. 3C) in one or more HA WAF mini-clusters 330 (one being shown in FIG. 3C, which mini-cluster 330 contains six WAF containers 320 in the non-limiting embodiment of FIG. 3C), the one or more HA WAF mini-clusters 330 being disposed in the HA WAF cluster 325. In the third configuration 300", each of the first through three user devices 305a-305c might independently or separately access (or might attempt to access) the web application 310 via the one or more networks 315 and the HA WAF cluster 325 containing the one or more HA WAF mini-cluster 330 each containing WAF containers 320. In response to multiple user devices 305a-305c sending requests to access the web application 310, the HA WAF cluster 325, the HA WAF mini-cluster(s) 330, and/or the WAF containers 320 might monitor network communications between each of the user devices 305a-305c and the HA WAF cluster 325, the HA WAF mini-cluster(s) 330, and/or the WAF containers 320, and might determine whether said network communications contain indications of one or more network attacks targeting the web application 310. Based on a determination that the network communications contain indications of one or more network attacks targeting the web application 310, the HA WAF cluster 325, the HA WAF mini-cluster(s) 330, and/or the WAF containers 320 might perform at least one of: blocking access to the web application 310 by one or more of the user devices 305a-305c; initiating one or more counter-measures against the one or more network attacks; updating one or more protection rules in at least one of the WAF containers 320 and/or in at least one of the HA WAF mini-clusters 330 to address the one or more network attacks; or implementing one or more new protection rules in at least one of the WAF containers 320 and/or in at least one of the HA WAF mini-clusters 330 to address the one or more network attacks; and/or the like. Based on a determination that the network communications do not contain indications of network attacks targeting the web application 310, the HA WAF cluster 325, the HA WAF mini-cluster(s) 330, and/or the WAF containers 320 might provide the unblocked one or more of the user devices 305a-305c with access to the web application 310. In some embodiments, monitoring the network communications might comprise dynamically monitoring (in some cases, in real-time or near real-time) the network communications.

According to some embodiments, the HA WAF cluster 325 or the container management server (e.g., the container management server 220 of FIG. 2 or the first computing system 105 of FIG. 1, or the like) that controls and/or manages the HA WAF cluster 325 might, based on the monitored network communications, determine at least one of whether one or more user devices of the plurality of user devices 305 are no longer accessing the corresponding software applications or whether use of hardware resources associated with the one or more software applications accessed by at least one user device among the plurality of user devices 305 has decreased below a predetermined amount required by the web application 310 and at least one of the HA WAF cluster 325, the HA WAF mini-cluster(s) 330, and/or the WAF containers 320. Based on a determination that at least one of one or more user devices of the plurality of user devices 305 are no longer accessing the web application 310 or that use of hardware resources associated with the web application 310 accessed by at least one user device among the plurality of user devices 305 has decreased below the predetermined amount required by the web application 310 and at least one of the HA WAF cluster 325, the HA WAF mini-cluster(s) 330, and/or the WAF containers 320, the HA WAF cluster 325 or the container management server might decommission at least one WAF container 320 and/or at least one HA WAF mini-cluster 330. In this case, compared with the second configuration 300', user devices 305d-305f no longer access (or attempt to access) the web application 310. As a result, use of hardware resources associated with the web application 310 and/or hardware resources associated with the HA WAF cluster 325, the HA WAF mini-cluster(s) 330, and/or the WAF containers 320 has decreased below an amount required by the web application 310 and/or the HA WAF cluster 325, the HA WAF mini-cluster(s) 330, and/or the WAF containers 320 (i.e., leaving at least some of the HA WAF mini-cluster(s) 330 and/or the WAF containers 320 idle or underutilized, or the like). In response to determining reduced use of hardware resources, the HA WAF cluster 325 or the container management server might decommission HA WAF mini-cluster(s) 330 and/or WAF containers 320 (in this case, seven WAF containers 320 in one HA WAF mini-cluster 330 compared with the second configuration 300').

Although one web application 310 is shown in FIG. 3, this is merely to simplify illustration of the configurations, but can be expanded and/or reconfigured to accommodate two or more web applications 310 being accessed or being attempted to be accessed by a plurality of user devices 305. In addition, although particular numbers of HA WAF mini-clusters 330 are depicted in HA WAF cluster 325 in FIG. 3, and although particular numbers of WAF containers 320 are depicted per HA WAF mini-clusters 330 in FIG. 3, the HA WAF cluster 325 may contain any suitable number of HA WAF mini-clusters 330, each containing any suitable number of WAF containers 320 (which, in some cases, may be different in number for different HA WAF mini-clusters 330 (not shown)).

FIGS. 4A-4D (collectively, "FIG. 4") are flow diagrams illustrating a method 400 for implementing HA WAF functionalities, in accordance with various embodiments. Method 400 of FIG. 4B continues onto FIG. 4C following the circular marker denoted, "A," which returns back to FIG. 4B following the circular marker denoted, "B." Method 400 of FIG. 4D returns to FIG. 4B following the circular marker denoted, "C."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, configurations, embodiments, or examples 100, 200, 300, 300', and 300" of FIGS. 1, 2, 3A, 3B, and 3C, respectively (or components thereof), such methods may also be implemented using any suitable hardware (or software) implementation. Similarly, while each of the systems, configurations, embodiments, or examples 100, 200, 300, 300', and 300" of FIGS. 1, 2, 3A, 3B, and 3C, respectively (or components thereof), can operate according to the method 400 illustrated by FIG. 4 (e.g., by executing instructions embodied on a computer readable medium), the systems, configurations, embodiments, or examples 100, 200, 300, 300', and 300" of FIGS. 1, 2, 3A, 3B, and 3C can each also operate according to other modes of operation and/or perform other suitable procedures.

Figure 4A:
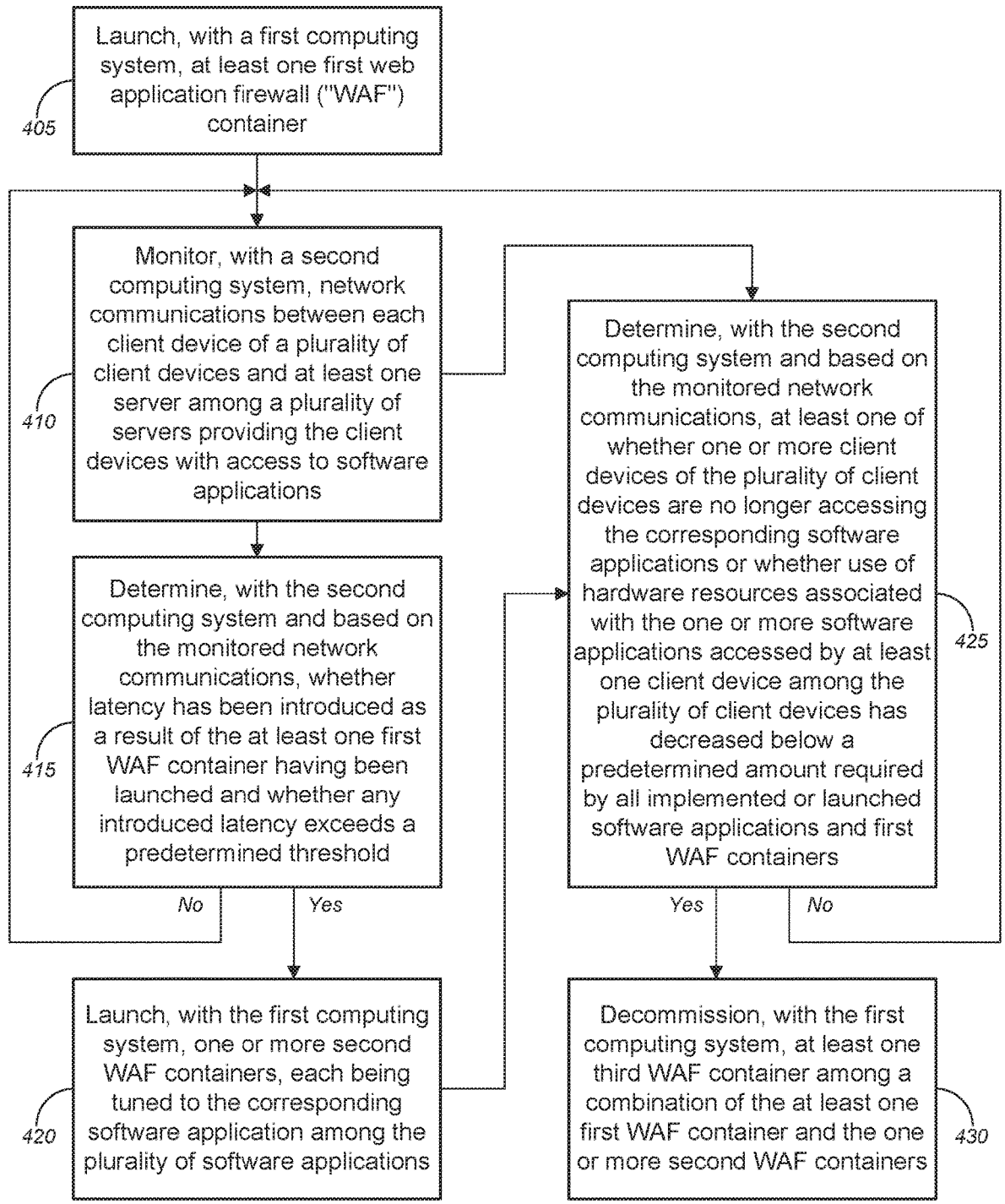
FIGS. 4A-4D are flow diagrams illustrating a method for implementing HA WAF functionalities, in accordance with various embodiments.

In the non-limiting embodiment of FIG. 4A, method 400, at block 405, might comprise launching, with a first computing system, at least one first web application firewall ("WAF") container, each being tuned to a corresponding software application among a plurality of software applications provided by at least one server among a plurality of servers, each first WAF container containing a fully functional and fully encapsulated WAF that protects, from network attacks, a software application to which said first WAF container is tuned. In some embodiments, the first computing system might include, without limitation, at least one of a container orchestration system, a container orchestration server, a container management system, or a container management server, and/or the like.

At block 410, method 400 might comprise monitoring, with a second computing system, network communications between each client device of a plurality of client devices and the at least one server among the plurality of servers providing the client devices with access to software applications, each client device being associated with a user among a plurality of users. According to some embodiments, the second computing system might include, but is not limited to, at least one of a load-balancing proxy server, a load-balancing proxy application programming interface ("API"), or a load-balancing system, and/or the like. In some cases, the first computing system and the second computing system might be disposed within the same computing system.

Method 400 might further comprise, at block 415, determining, with the second computing system and based on the monitored network communications, whether latency has been introduced as a result of the at least one first WAF container having been launched and whether any introduced latency exceeds a predetermined threshold. Based on a determination either that latency has not been introduced as a result of the at least one first WAF container having been launched or that latency has been introduced but does not exceed the predetermined threshold, the method might return to the process at block 410 and continue monitoring network communications between each client device and at least one server among the plurality of servers. Based on a determination that latency has been introduced as a result of the at least one first WAF container having been launched and based on a determination that the introduced latency exceeds the predetermined threshold, the method might continue onto block 420. At block 420, method 400 might comprise launching, with the first computing system, one or more second WAF containers, each being tuned to the corresponding software application among the plurality of software applications.

Method 400 might further comprise determining, with the second computing system and based on the monitored network communications, at least one of whether one or more client devices of the plurality of client devices are no longer accessing the corresponding software applications or whether use of hardware resources associated with the one or more software applications accessed by at least one client device among the plurality of client devices has decreased below a predetermined amount required by all implemented or launched software applications and first WAF containers (block 425). Based on a determination that one or more client devices of the plurality of client devices continue accessing the corresponding software applications and based on a determination that use of hardware resources associated with the one or more software applications accessed by at least one client device among the plurality of client devices has not yet decreased below the predetermined amount required by all implemented or launched software applications and first WAF containers, the method might return to the process at block 410 and might continue monitoring network communications between each client device and at least one server among the plurality of servers. Based on a determination that at least one of one or more client devices of the plurality of client devices are no longer accessing the corresponding software applications or use of hardware resources associated with the one or more software applications accessed by at least one client device among the plurality of client devices has decreased below the predetermined amount required by all implemented or launched software applications and first WAF containers, the method might continue onto block 430. At block 430, method 400 might comprise decommissioning, with the first computing system, at least one third WAF container among a combination of the at least one first WAF container and the one or more second WAF containers.

Merely by way of example, in some embodiments, the at least one first WAF container might include, without limitation, at least one first WAF cluster, each first WAF cluster comprising a cluster of two or more first WAF containers. In some cases, one or more of the at least one first WAF cluster might each include, but is not limited to, at least one first WAF mini cluster, each first WAF mini cluster comprising two or more first WAF containers. In some instances, each first WAF mini cluster might be configured to apply a WAF rule, while the first WAF cluster might be configured to apply multiple WAF rules using different first WAF mini clusters. According to some embodiments, launching one or more second WAF containers might comprise launching one or more second WAF containers in at least one of one or more second WAF clusters or one or more second WAF mini clusters. In some cases, each second WAF mini cluster might be configured to apply a WAF rule, while the second WAF cluster might be configured to apply multiple WAF rules using different second WAF mini clusters.

Figure 4B:
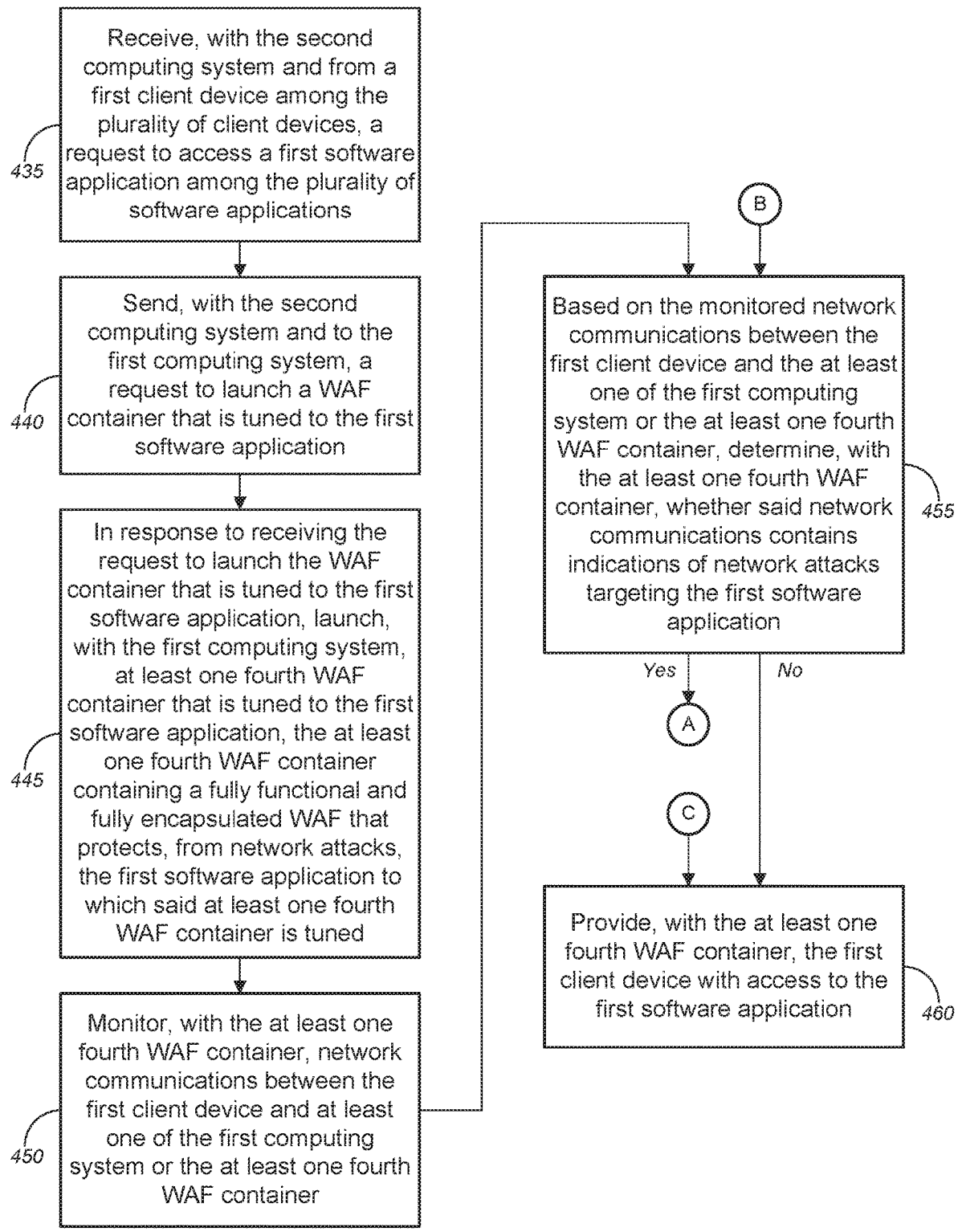

With reference to FIG. 4B, the method 400 might further comprise receiving, with the second computing system and from a first client device among the plurality of client devices, a request to access a first software application among the plurality of software applications (block 435); sending, with the second computing system and to the first computing system, a request to launch a WAF container that is tuned to the first software application (block 440); and in response to receiving the request to launch the WAF container that is tuned to the first software application, launching, with the first computing system, at least one fourth WAF container that is tuned to the first software application, the at least one fourth WAF container containing a fully functional and fully encapsulated WAF that protects, from network attacks, the first software application to which said at least one fourth WAF container is tuned (block 445).

At block 450, method 400 might comprise monitoring, with the at least one fourth WAF container, network communications between the first client device and at least one of the first computing system or the at least one fourth WAF container. Method 400 might further comprise, at block 455, based on the monitored network communications between the first client device and the at least one of the first computing system or the at least one fourth WAF container, determining, with the at least one fourth WAF container, whether said network communications contains indications of network attacks targeting the first software application. Based on a determination that the network communications between the first client device and the at least one of the first computing system or the at least one fourth WAF container does not contain indications of one or more network attacks targeting the first software application, the method might continue onto block 460. At block 460, method 400 might comprise providing, with the at least one fourth WAF container, the first client device with access to the first software application. Based on a determination that the network communications between the first client device and the at least one of the first computing system or the at least one fourth WAF container contains indications of one or more network attacks targeting the first software application, the method might continue onto at least one of blocks 465-480 in FIG. 4C, following circular marker denoted, "A."

Figure 4C:
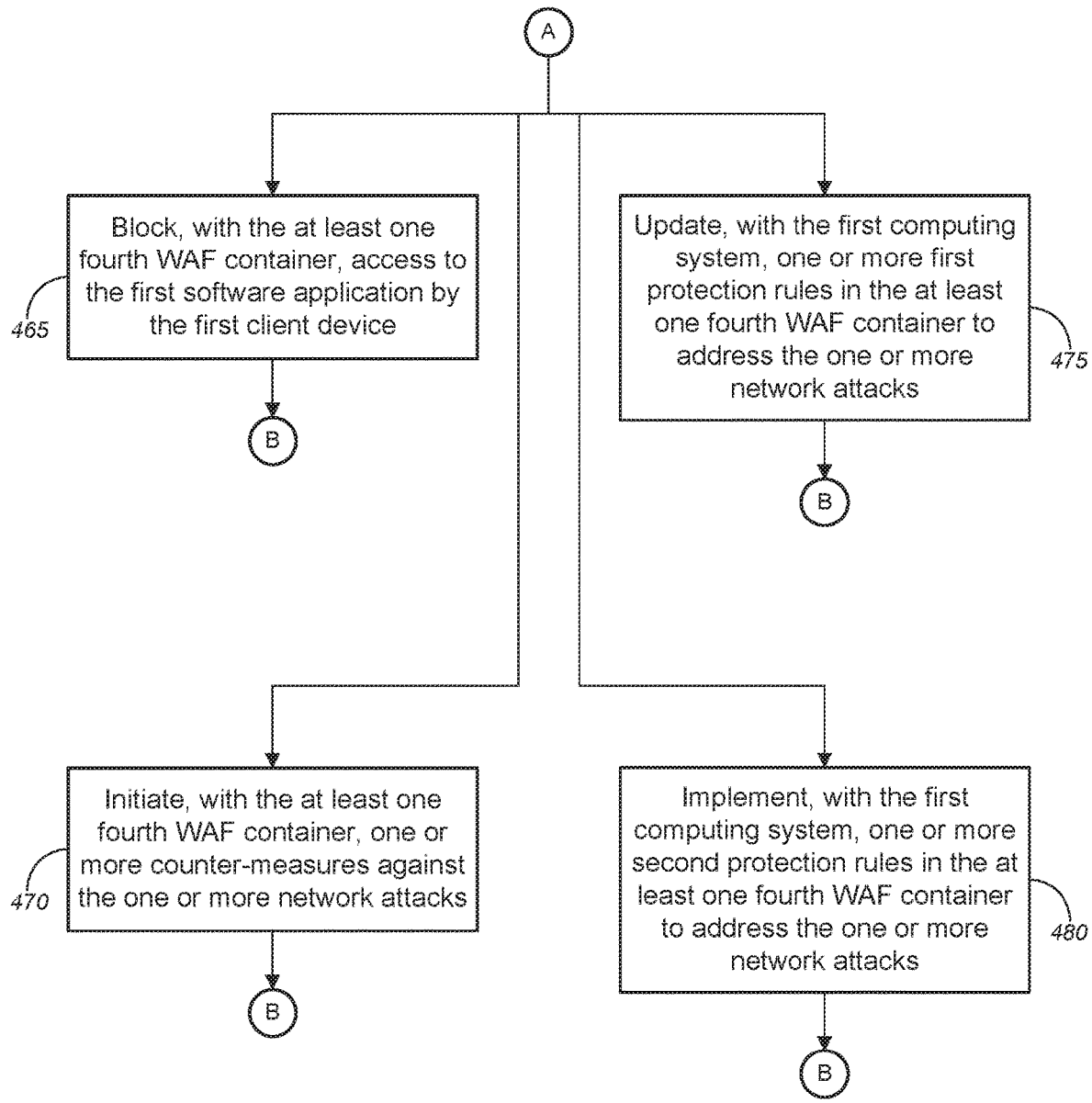

Turning to FIG. 4C (following the circular marker denoted, "A"), method 400 might further comprise at least one of blocking, with the at least one fourth WAF container, access to the first software application by the first client device (block 465); initiating, with the at least one fourth WAF container, one or more counter-measures against the one or more network attacks (block 470); updating, with the first computing system, one or more first protection rules in the at least one fourth WAF container to address the one or more network attacks (block 475); implementing, with the first computing system, one or more second protection rules in the at least one fourth WAF container to address the one or more network attacks (block 480); and/or the like. The method 400 might return to the process of block 455 in FIG. 4B, following circular marker denoted, "B."

Figure 4D:
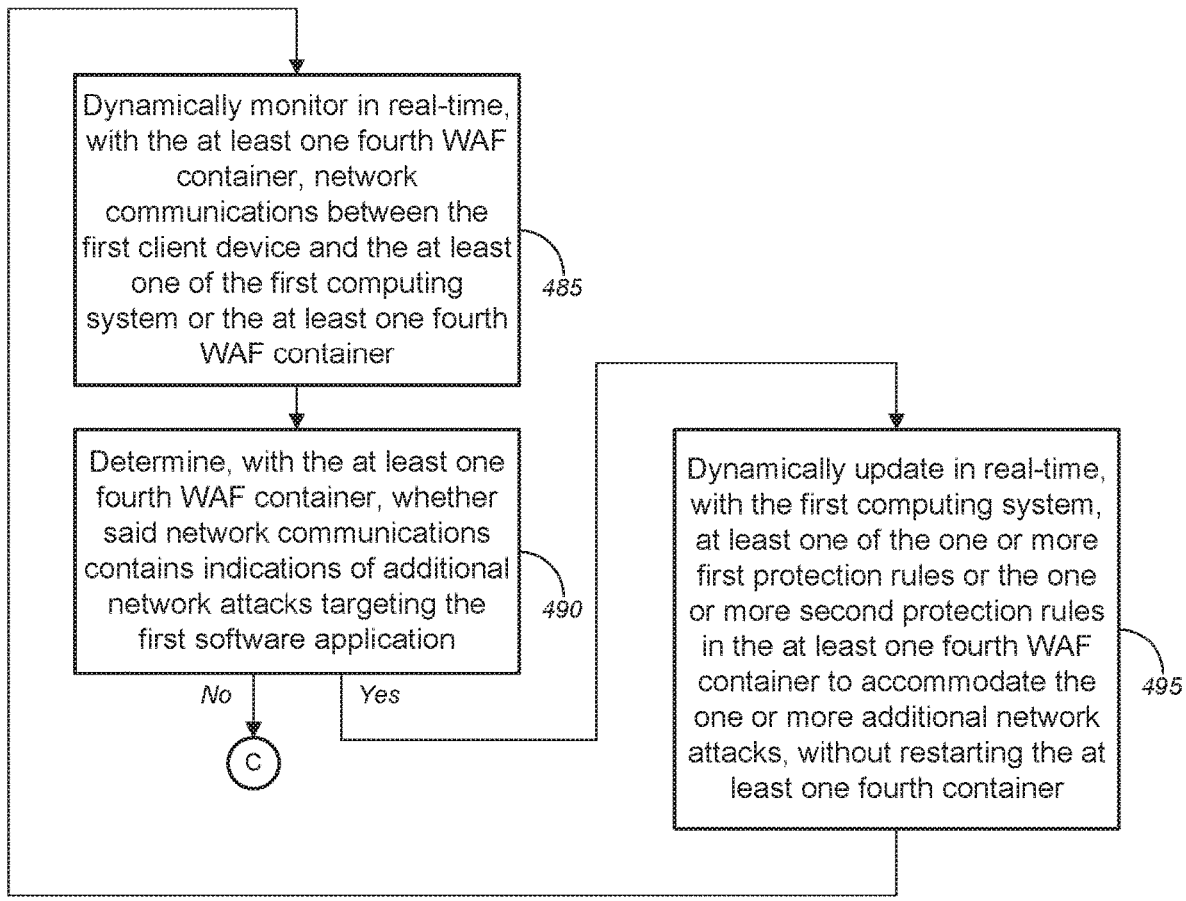

Referring to FIG. 4D, monitoring network communications between the first client device and the at least one of the first computing system or the at least one fourth WAF container (at block 450) might comprise dynamically monitoring in real-time, with the at least one fourth WAF container, network communications between the first client device and the at least one of the first computing system or the at least one fourth WAF container (block 485). Method 400 might, at block 490, comprise, based on the dynamically monitored network communications between the first client device and the at least one of the first computing system or the at least one fourth WAF container, determining, with the at least one fourth WAF container, whether said network communications contains indications of additional network attacks targeting the first software application. Based on a determination that the network communications between the first client device and the at least one of the first computing system or the at least one fourth WAF container contain indications of one or more additional network attacks targeting the first software application, the method might continue onto the process of block 495. At block 495, method 400 might comprise dynamically updating in real-time, with the first computing system, at least one of the one or more first protection rules or the one or more second protection rules in the at least one fourth WAF container to accommodate the one or more additional network attacks, without restarting the at least one fourth container. Based on a determination that the network communications between the first client device and the at least one of the first computing system or the at least one fourth WAF container does not contain indications of one or more additional network attacks targeting the first software application, the method might return to block 460 in FIG. 4B, following circular marker denoted, "C."

In some embodiments, at least one of the one or more first protection rules or the one or more second protection rules might be stored in or retrieved from a rules repository (which might be embodied in a database such as, but not limited to, database(s) 110 and 120 of FIG. 1, or the like).

Exemplary System and Hardware Implementation

Figure 5:
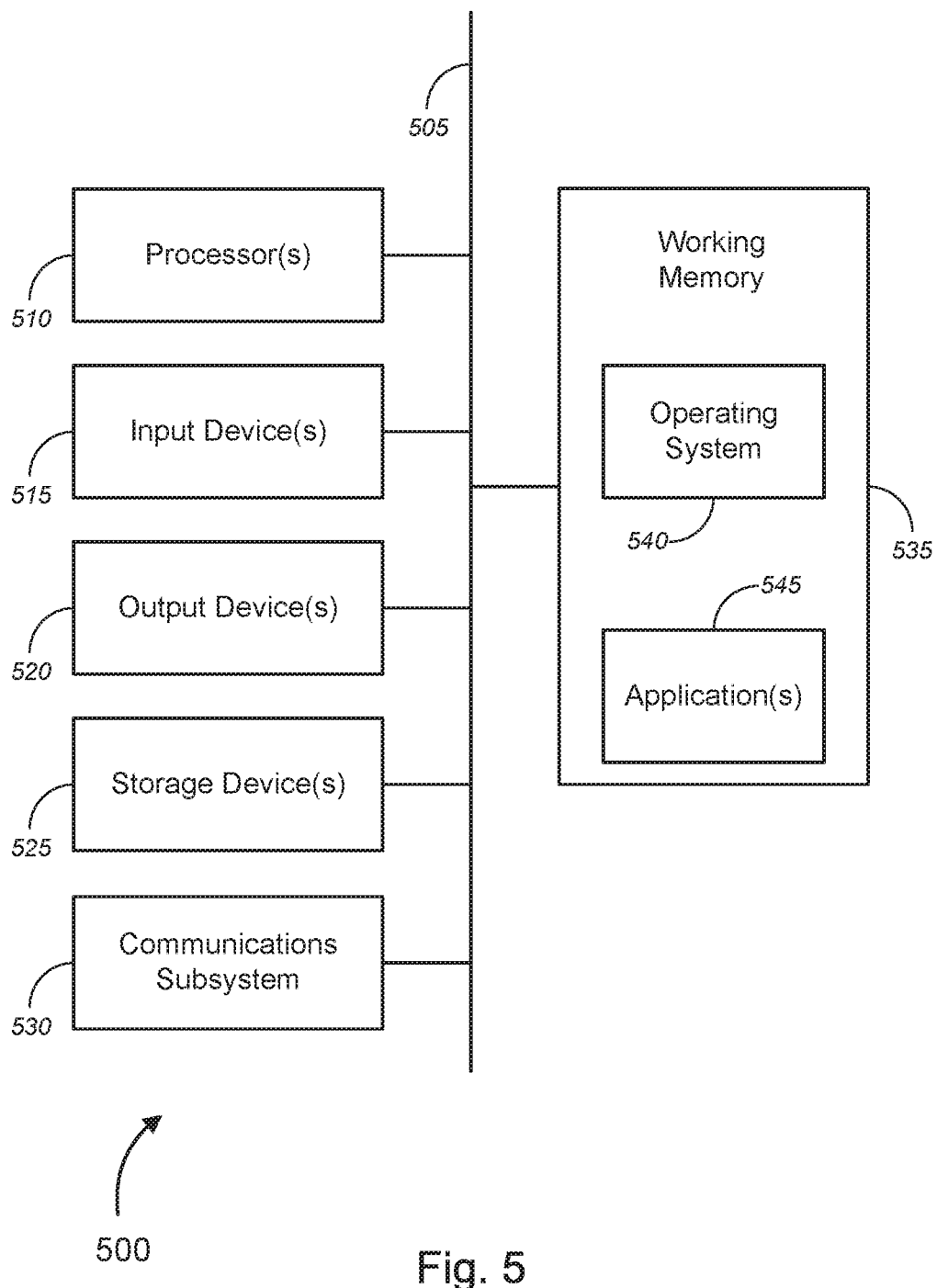
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105 and 115, router 205, container management server 220, switches 125, 130, 210, and 225, servers 135a-135n and 230a-230n, resource servers 145a-145n and 240a-240n, user devices 160a-160n, 250a-250n, and 305a-305f, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105 and 115, router 205, container management server 220, switches 125, 130, 210, and 225, servers 135a-135n and 230a-230n, resource servers 145a-145n and 240a-240n, user devices 160a-160n, 250a-250n, and 305a-305f, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
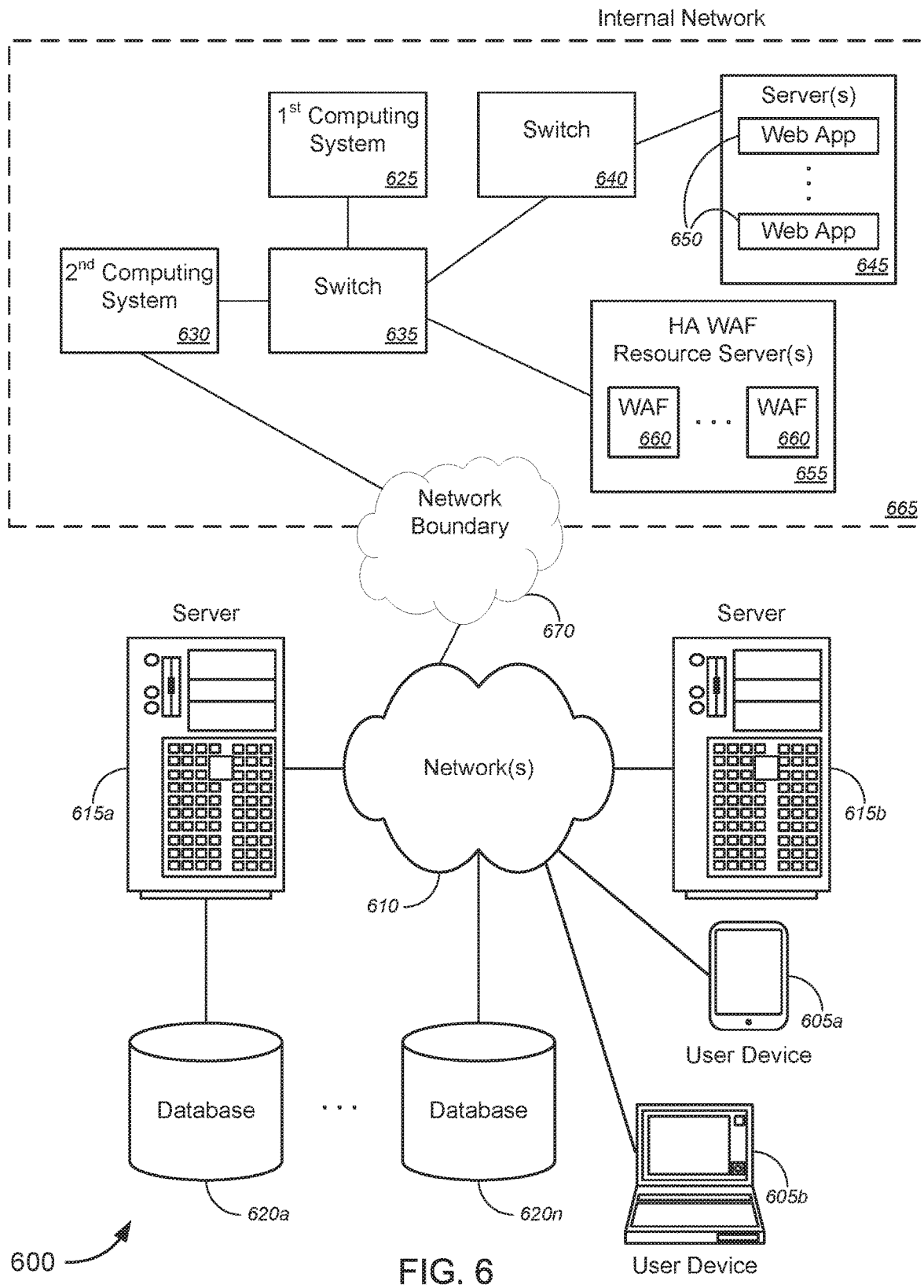
FIG. 6 is a block diagram illustrating a networked system of computers, computing systems, or system hardware architecture, which can be used in accordance with various embodiments.

As noted above, a set of embodiments comprises methods and systems for implementing firewall functionalities, and, more particularly, to methods, systems, and apparatuses for implementing high availability ("HA") web application firewall ("WAF") functionalities. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 610 (similar to network(s) 165 and network boundary 170 of FIG. 1, network boundary 255 of FIG. 2, network(s) 315 of FIGS. 3A-3C, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing firewall functionalities, and, more particularly, to methods, systems, and apparatuses for implementing high availability ("HA") web application firewall ("WAF") functionalities, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a first computing system 625 (similar to first computing system 105 or container management server 220 of FIG. 1 or 2, or the like), second computing system 630 (similar to second computing system 115 or router 205 of FIG. 1 or 2, or the like), switch 635 (similar to switches 125 or 210 of FIG. 1 or 2, or the like), switch 640 (similar to switches 130 or 225 of FIG. 1 or 2, or the like), one or more servers 645 containing web apps 650 (similar to servers 135a-135n containing apps 140 of FIG. 1, servers 230a-230n containing apps 235 of FIG. 2, or the like), one or more high availability ("HA") web application firewall ("WAF") resource servers 655 containing one or more WAF containers 660 (similar to HA WAF resource servers 145a-145n containing one or more WAF containers 150 of FIG. 1, HA WAF resource servers 240a-240n containing one or more WAF containers 245 of FIG. 2, or the like), all of which might be disposed within internal network 665, and might communicatively coupled to user devices 605a or 605b via network(s) 610 and network boundary 670.

In operation, one or more user devices 605 of the user devices 605a-605n might independently or separately access (or might attempt or request to access) at least one web application 650 among the one or more web applications 650. The second computing system 630 might serve as a proxy server to intercept network communications from the one or more user devices 605. The second computing system 630 and/or the first computing system 625 might monitor said network communications, and might determine whether said network communications contain indications of one or more network attacks targeting the at least one web application 650. Based on a determination that the network communications contain indications of one or more network attacks targeting the at least one web application 650, the first computing system 625 might control or manage (via switch 635, which is controlled by the second computing system 630) at least one of HA WAF resource servers 655 and/or WAF containers 660 (which might be configured in clusters or mini-clusters of WAF containers 660) to perform at least one of: blocking access to the at least one web application 650 by the one or more user devices 605; initiating one or more counter-measures against the one or more network attacks; updating one or more existing protection rules in at least one of the WAF containers 660 and/or in at least one of the HA WAF mini-clusters or the HA WAF cluster to address the one or more network attacks; or implementing one or more new protection rules in at least one of the WAF containers 660 and/or in at least one of the HA WAF mini-clusters or the HA WAF cluster to address the one or more network attacks; and/or the like. In some embodiments, at least one of the one or more existing protection rules or the one or more new protection rules might be stored in or retrieved from a rules repository (which might be embodied in a database such as, but not limited to, database(s) 620a-620n or database(s) 110 and 120 of FIG. 1, or the like). Based on a determination that the network communications do not contain indications of network attacks targeting the web application 650, the first computing system 625 might control or manage the HA WAF cluster, the HA WAF mini-cluster(s), and/or the WAF containers 660 to provide the unblocked at least one of the one or more user devices 605 with access to the at least one web application 650 via switch 635 (which is controlled by the second computing system 630), via switch 640 (which controls access to the corresponding server(s) 645 on which the at least one web application 650 might be disposed or contained). In some embodiments, monitoring the network communications might comprise dynamically monitoring (in some cases, in real-time or near real-time) the network communications.

According to some embodiments, the first computing system 625 might, based on the monitored network communications, determine whether latency has been introduced as a result of the plurality of WAF containers 660 having been launched—and/or as a result of active WAF containers 660 and/or mini-clusters of WAF containers 660 having been overwhelmed by one or more of excess user devices 605 attempting to access the at least one web application 650, an increased number of attacks targeting the at least one web application 650, and/or different types of attacks targeting the at least one web application 650, or the like—and based on a determination that the introduced latency exceeds the predetermined threshold. Based on a determination that latency has been introduced as a result of at least one WAF container having been launched—and/or as a result of active WAF containers 660 and/or mini-clusters of WAF containers 660 having been overwhelmed by one or more of excess user devices 605 attempting to access the at least one web application 650, an increased number of attacks targeting the at least one web application 650, and/or different types of attacks targeting the at least one web application 650, or the like—and based on a determination that the introduced latency exceeds the predetermined threshold, the first computing system 625 might launch one or more additional WAF containers and/or one or more HA WAF mini-clusters (and/or might reconfigure existing WAF containers 660 and/or existing HA WAF mini-clusters of WAF containers 660, or the like), each being tuned to the at least one web application 650.

In some embodiments, the first computing system 625 might, based on the monitored network communications, determine at least one of whether one or more user devices 605 of the plurality of user devices 605 are no longer accessing the at least one web application 650 or whether use of hardware resources associated with the at least one web application 650 accessed by at least one user device 605 among the plurality of user devices 605 has decreased below a predetermined amount required by the at least one web application 650 and at least one of the HA WAF cluster, the HA WAF mini-cluster(s), and/or the WAF containers 660. Based on a determination that at least one of one or more user devices 605 of the plurality of user devices 605 are no longer accessing the at least one web application 650 or that use of hardware resources associated with the at least one web application 650 accessed by at least one user device 605 among the plurality of user devices 605 has decreased below the predetermined amount required by the at least one web application 650 and at least one of the HA WAF cluster, the HA WAF mini-cluster(s), and/or the WAF containers 660, the HA WAF cluster or the first computing system 625 might decommission at least one WAF container 660 and/or at least one HA WAF mini-cluster. In this case, user devices 605 no longer access (or attempt to access) the at least one web application 650. As a result, use of hardware resources associated with the at least one web application 650 and/or hardware resources associated with the HA WAF cluster, the HA WAF mini-cluster(s), and/or the WAF containers 660 has decreased below an amount required by the at least one web application 650 and/or the HA WAF cluster, the HA WAF mini-cluster(s), and/or the WAF containers 660 (i.e., leaving at least some of the HA WAF mini-cluster(s) and/or the WAF containers 660 idle or underutilized, or the like). In response to determining reduced use of hardware resources, the HA WAF cluster or the first computing system 625 might decommission or delete HA WAF mini-cluster(s) and/or WAF containers 660.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    launching, with a first computing system, at least one first web application firewall ("WAF") container, each being tuned to a corresponding software application among a plurality of software applications provided by at least one server;
    monitoring, with a second computing system, network communications between each client device of a plurality of client devices and the at least one server providing the client devices with access to software applications;
    determining, with the second computing system and based on the monitored network communications, whether latency has been introduced as a result of the at least one first WAF container having been launched and whether any introduced latency exceeds a predetermined threshold;
    based on a determination that latency has been introduced as a result of the at least one first WAF container having been launched and based on a determination that the introduced latency exceeds the predetermined threshold, launching, with the first computing system, one or more second WAF containers,
    wherein the at least one first WAF container comprises at least one first WAF cluster, each first WAF cluster comprising a cluster of two or more first WAF containers,
    wherein one or more of the at least one first WAF cluster each comprises at least one first WAF mini cluster, each first WAF mini cluster comprising two or more first WAF containers,
    wherein each first WAF mini cluster is configured to apply a WAF rule, and
    wherein the first WAF cluster is configured to apply multiple WAF rules using different first WAF mini clusters.

2. The method of claim 1, wherein the first computing system comprises at least one of a container orchestration system, a container orchestration server, a container management system, or a container management server.

3. The method of claim 1, wherein the second computing system comprises at least one of a load-balancing proxy server, a load-balancing proxy application programming interface ("API"), or a load-balancing system.

4. A method, comprising:
    monitoring, with a first computing system, network communications between each client device of a plurality of client devices and at least one server providing the client devices with access to software applications;
    determining, with the first computing system and based on the monitored network communications, whether latency has been introduced as a result of at least one first web application firewall ("WAF") container having been launched by a second computing system and whether any introduced latency exceeds a predetermined threshold; and
    based on a determination that latency has been introduced as a result of the at least one first WAF container having been launched and based on a determination that the introduced latency exceeds the predetermined threshold, launching, with the second computing system, one or more second WAF containers.

5. The method of claim 4, wherein the first computing system comprises at least one of a load-balancing proxy server, a load-balancing proxy application programming interface ("API"), or a load-balancing system.

6. The method of claim 4, wherein the second computing system comprises at least one of a container orchestration system, a container orchestration server, a container management system, or a container management server.

7. The method of claim 4, wherein the first computing system and the second computing system are disposed within the same computing system.

8. The method of claim 4, wherein the at least one first WAF container comprises at least one first WAF cluster, each first WAF cluster comprising a cluster of two or more first WAF containers.

9. The method of claim 8, wherein one or more of the at least one first WAF cluster each comprises at least one first WAF mini cluster, each first WAF mini cluster comprising two or more first WAF containers, wherein each first WAF mini cluster is configured to apply a WAF rule, wherein the first WAF cluster is configured to apply multiple WAF rules using different first WAF mini clusters.

10. The method of claim 4, wherein launching one or more second WAF containers comprises launching one or more second WAF containers in at least one of one or more second WAF clusters or one or more second WAF mini clusters, wherein each second WAF mini cluster is configured to apply a WAF rule, wherein the second WAF cluster is configured to apply multiple WAF rules using different second WAF mini clusters.

11. The method of claim 4, further comprising:
    launching, with the second computing system, the at least one first WAF container.

12. The method of claim 4, further comprising:
    determining, with the first computing system and based on the monitored network communications, at least one of whether one or more client devices of the plurality of client devices are no longer accessing the corresponding software applications or whether use of hardware resources associated with the one or more software applications accessed by at least one client device among the plurality of client devices has decreased below a predetermined amount required by all implemented or launched software applications and first WAF containers; and
    based on a determination that at least one of one or more client devices of the plurality of client devices are no longer accessing the corresponding software applications or that use of hardware resources associated with the one or more software applications accessed by at least one client device among the plurality of client devices has decreased below the predetermined amount required by all implemented or launched software applications and first WAF containers, decommissioning, with the second computing system, at least one third WAF container among a combination of the at least one first WAF container and the one or more second WAF containers.

13. The method of claim 4, further comprising:
    receiving, with the first computing system and from a first client device among the plurality of client devices, a request to access a first software application among the plurality of software applications;

sending, with the first computing system and to the second computing system, a request to launch a WAF container that is tuned to the first software application;

in response to receiving the request to launch the WAF container that is tuned to the first software application, launching, with the second computing system, at least one fourth WAF container that is tuned to the first software application, the at least one fourth WAF container containing a fully functional and fully encapsulated WAF that protects, from network attacks, the first software application to which said at least one fourth WAF container is tuned;

monitoring, with the at least one fourth WAF container, network communications between the first client device and at least one of the second computing system or the at least one fourth WAF container;

based on the monitored network communications between the first client device and the at least one of the second computing system or the at least one fourth WAF container, determining, with the at least one fourth WAF container, whether said network communications contains indications of network attacks targeting the first software application;

based on a determination that the network communications between the first client device and the at least one of the second computing system or the at least one fourth WAF container contains indications of one or more network attacks targeting the first software application, performing at least one of:

blocking, with the at least one fourth WAF container, access to the first software application by the first client device;

initiating, with the at least one fourth WAF container, one or more counter-measures against the one or more network attacks;

updating, with the second computing system, one or more first protection rules in the at least one fourth WAF container to address the one or more network attacks; or implementing, with the second computing system, one or more second protection rules in the at least one fourth WAF container to address the one or more network attacks; and based on a determination that the network communications between the first client device and the at least one of the second computing system or the at least one fourth WAF container do not contain indications of one or more network attacks targeting the first software application, providing, with the at least one fourth WAF container, the first client device with access to the first software application.

14. The method of claim 13, wherein monitoring network communications between the first client device and the at least one of the second computing system or the at least one fourth WAF container comprises dynamically monitoring in real-time, with the at least one fourth WAF container, network communications between the first client device and the at least one of the second computing system or the at least one fourth WAF container, wherein the method further comprises:

based on the dynamically monitored network communications between the first client device and the at least one of the second computing system or the at least one fourth WAF container, determining, with the at least one fourth WAF container, whether said network communications contains indications of additional network attacks targeting the first software application; and based on a determination that the network communications between the first client device and the at least one of the second computing system or the at least one fourth WAF container contains indications of one or more additional network attacks targeting the first software application, dynamically updating in real-time, with the second computing system, at least one of the one or more first protection rules or the one or more second protection rules in the at least one fourth WAF container to accommodate the one or more additional network attacks, without restarting the at least one fourth container.

15. The method of claim 13, wherein at least one of the one or more first protection rules or the one or more second protection rules are stored in or retrieved from a rules repository.

16. A system, comprising:

a first computing system, comprising:
at least one first processor; and
a first non-transitory computer readable medium communicatively coupled to the at least one first processor, the first non-transitory computer readable medium having stored thereon computer software comprising a first set of instructions that, when executed by the at least one first processor, causes the first computing system to:
monitor network communications between each client device of a plurality of client devices and at least one server among a plurality of servers providing the client devices with access to software applications, each client device being associated with a user among a plurality of users; and
determine, based on the monitored network communications, whether latency has been introduced as a result of at least one first web application firewall ("WAF") container having been launched by a second computing system and whether any introduced latency exceeds a predetermined threshold; and the second computing system, comprising:
at least one second processor; and
a second non-transitory computer readable medium communicatively coupled to the at least one second processor, the second non-transitory computer readable medium having stored thereon computer software comprising a second set of instructions that, when executed by the at least one second processor, causes the second computing system to:
based on a determination that latency has been introduced as a result of the at least one first WAF container having been launched and based on a determination that the introduced latency exceeds the predetermined threshold, launch one or more second WAF containers.

17. The system of claim 16, wherein the first computing system comprises at least one of a load-balancing proxy server, a load-balancing proxy application programming interface ("API"), or a load-balancing system.

18. The system of claim 16, wherein the second computing system comprises at least one of a container orchestration system, a container orchestration server, a container management system, or a container management server.

19. The system of claim 16, wherein the second set of instructions, when executed by the at least one second processor, further causes the second computing system to:

launch the at least one first WAF container.

20. The system of claim 16, wherein:
the first set of instructions, when executed by the at least one first processor, further causes the first computing system to:
  determine, based on the monitored network communications, at least one of whether one or more client devices of the plurality of client devices are no longer accessing the corresponding software applications or whether use of hardware resources associated with the one or more software applications accessed by at least one client device among the plurality of client devices has decreased below a predetermined amount required by all implemented or launched software applications and first WAF containers; and
the second set of instructions, when executed by the at least one second processor, further causes the second computing system to:
  based on a determination that at least one of one or more client devices of the plurality of client devices are no longer accessing the corresponding software applications or use of hardware resources associated with the one or more software applications accessed by at least one client device among the plurality of client devices has decreased below the predetermined amount required by all implemented or launched software applications and first WAF containers, decommission at least one third WAF container among a combination of the at least one first WAF container and the one or more second WAF containers.

* * * * *